United States Patent
Piazza et al.

(10) Patent No.: US 8,908,787 B2
(45) Date of Patent: Dec. 9, 2014

(54) SYSTEMS AND METHODS FOR SELECTING RECONFIGURABLE ANTENNAS IN MIMO SYSTEMS

(75) Inventors: Daniele Piazza, Lodi (IT); John Kountouriotis, Philadelphia, PA (US); Michele D'Amico, Milan (IT); Kapil R. Dandekar, Philadelphia, PA (US)

(73) Assignee: Politecnico di Milano, Milan (IT)

( * ) Notice: Subject to any disclaimer, the term of this patent is extended or adjusted under 35 U.S.C. 154(b) by 399 days.

(21) Appl. No.: 13/146,332

(22) PCT Filed: Jan. 25, 2010

(86) PCT No.: PCT/US2010/021917
§ 371 (c)(1),
(2), (4) Date: Oct. 5, 2011

(87) PCT Pub. No.: WO2010/085722
PCT Pub. Date: Jul. 29, 2010

(65) Prior Publication Data
US 2012/0106613 A1 May 3, 2012

Related U.S. Application Data

(60) Provisional application No. 61/147,365, filed on Jan. 26, 2009.

(51) Int. Cl.
| | | |
|---|---|---|
| H04B 7/02 | (2006.01) | |
| H04L 1/02 | (2006.01) | |
| H01Q 9/04 | (2006.01) | |
| H04B 7/06 | (2006.01) | |
| H01Q 1/12 | (2006.01) | |
| H04B 7/04 | (2006.01) | |
| H01Q 3/24 | (2006.01) | |
| H01Q 13/10 | (2006.01) | |

(52) U.S. Cl.
CPC ........... H01Q 1/1257 (2013.01); H01Q 9/0407 (2013.01); H04B 7/0689 (2013.01); H04B 7/0434 (2013.01); H01Q 3/24 (2013.01); H01Q 13/10 (2013.01)
USPC .......................................... 375/267; 455/132

(58) Field of Classification Search
None
See application file for complete search history.

(56) References Cited

U.S. PATENT DOCUMENTS

| | | | |
|---|---|---|---|
| 5,491,644 A | | 2/1996 | Pickering et al. |
| 5,924,020 A | * | 7/1999 | Forssen et al. ................ 455/129 |

(Continued)

FOREIGN PATENT DOCUMENTS

| | | |
|---|---|---|
| WO | WO 2007/041845 | 4/2007 |
| WO | WO 2007/095102 | 8/2007 |

OTHER PUBLICATIONS

European Patent Application No. EP 10 73 3953: Extended European Search Report dated Dec. 3, 2012, 7 pages.

(Continued)

*Primary Examiner* — Shuwang Liu
*Assistant Examiner* — Gina McKie
(74) *Attorney, Agent, or Firm* — Baker & Hostetler LLP

(57) ABSTRACT

A method allows reconfigurable multi-element antennas to select the antenna configuration in MIMO, SIMO and MISO communication system. This selection scheme uses spatial correlation, channel reciprocal condition number, delay spread and average Signal to Noise Ratio (SNR) information to select the antenna radiation pattern at the receiver. Using this approach, it is possible to achieve capacity gains in a multi-element reconfigurable antenna system without modifying the data frame of a conventional wireless communication system. The capacity gain achievable with this configuration selection approach is calculated through numerical simulations using reconfigurable circular patch antennas at the receiver of a MIMO system that employs minimum mean square error receivers for channel estimation. Channel capacity and Bit Error Rate (BER) results show the improvement offered relative to a conventional antenna selection technique for reconfigurable MIMO systems.

28 Claims, 16 Drawing Sheets

(56) References Cited

U.S. PATENT DOCUMENTS

| | | | |
|---|---|---|---|
| 6,239,747 B1* | 5/2001 | Kaminski | 342/442 |
| 6,917,790 B1* | 7/2005 | Braun et al. | 455/101 |
| 2002/0055345 A1* | 5/2002 | Wood, Jr. | 455/277.1 |
| 2005/0237971 A1 | 10/2005 | Skraparlis | |
| 2006/0083195 A1 | 4/2006 | Forenza et al. | |
| 2006/0222101 A1* | 10/2006 | Cetiner et al. | 375/267 |
| 2007/0035463 A1 | 2/2007 | Hirabayashi | |
| 2007/0126631 A1 | 6/2007 | Goldberg | |
| 2007/0149180 A1 | 6/2007 | Lin et al. | |
| 2007/0258537 A1* | 11/2007 | Mailaender | 375/267 |
| 2008/0080631 A1 | 4/2008 | Forenza et al. | |
| 2009/0190691 A1 | 7/2009 | Ariyavisitakul et al. | |

OTHER PUBLICATIONS

PCT Application No. PCT/US2010/21917 : International Search Report and Written Opinion of the International Searching Authority, Apr. 22, 2010, 8 pages.

* cited by examiner

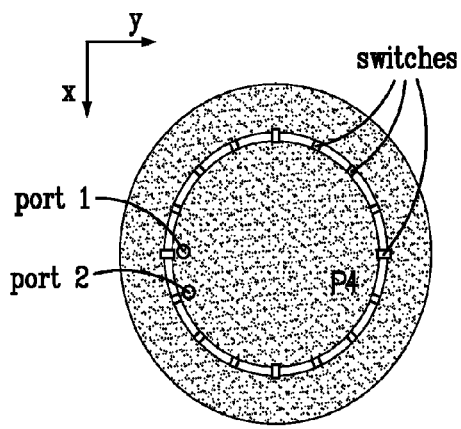
FIG. 1A
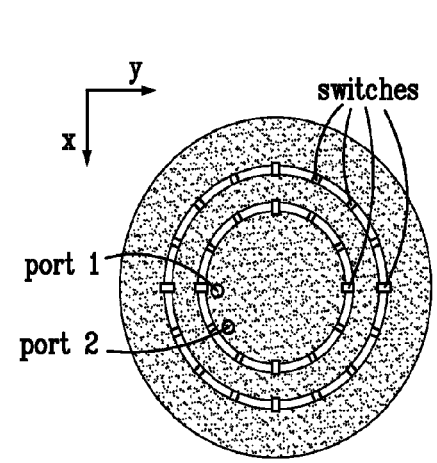
FIG. 1B
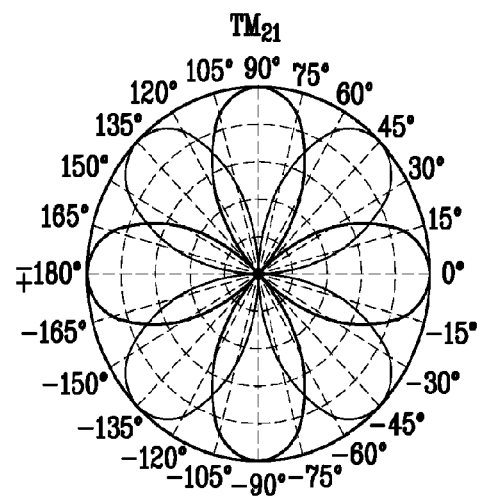
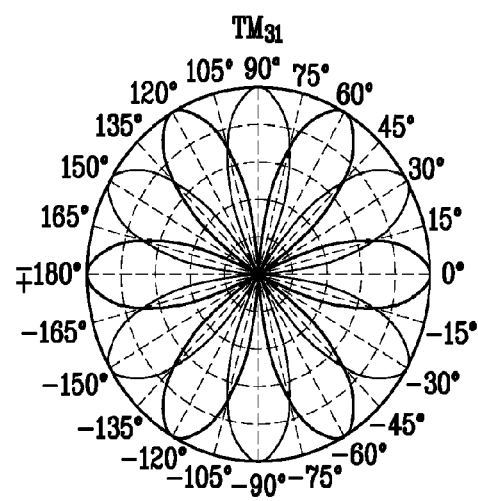
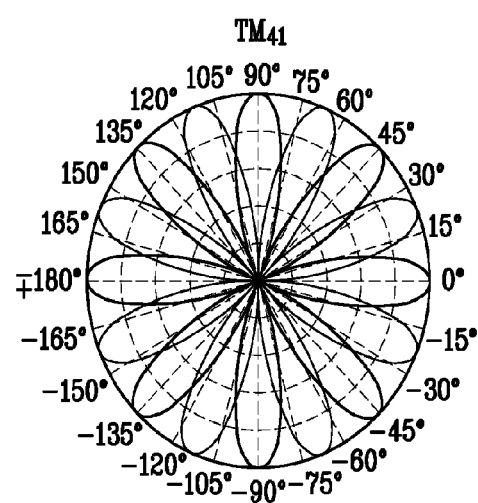
FIG. 1C

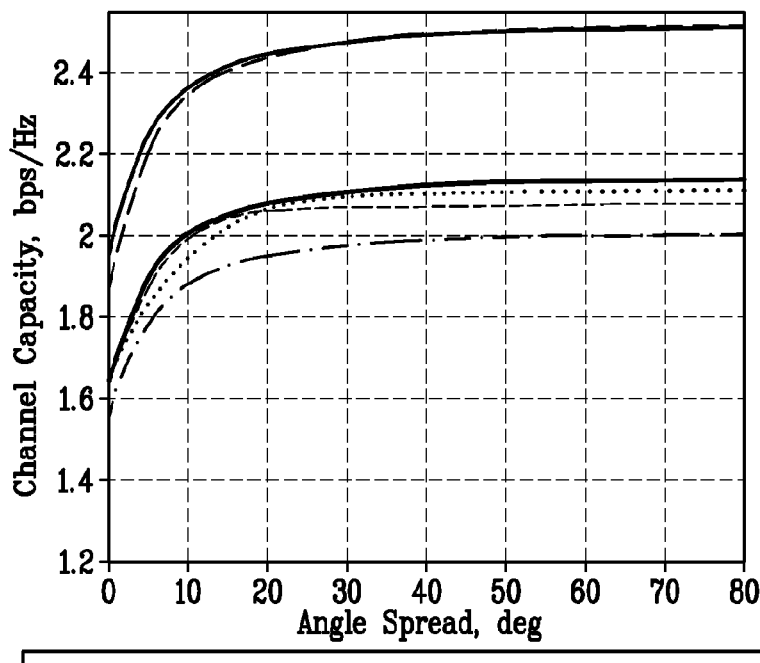
FIG. 8A
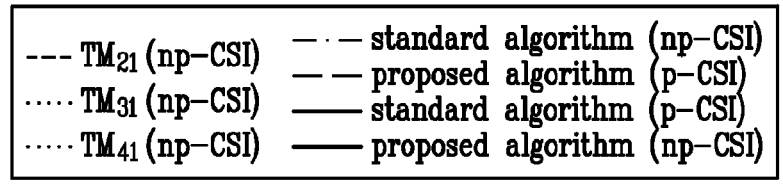
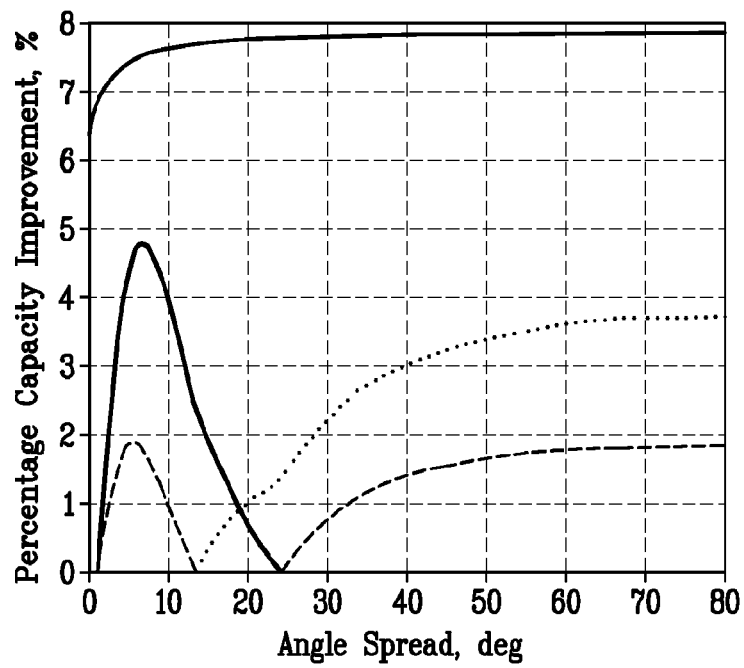
FIG. 8B
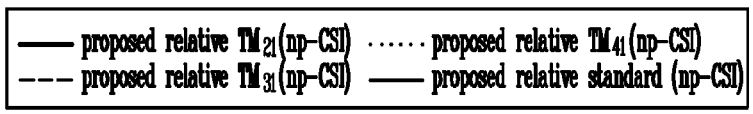

| SNR $D_\lambda$ | 0 dB | 5 dB | 10 dB | 15 dB | 20 dB | 25 dB |
|---|---|---|---|---|---|---|
| (40, ∞) | $TM_{31}$ | $TM_{41}$ | $TM_{41}$ | $TM_{41}$ | $TM_{41}$ | $TM_{41}$ |
| (30, 40] | $TM_{31}$ | $TM_{31}$ | $TM_{41}$ | $TM_{41}$ | $TM_{41}$ | $TM_{41}$ |
| (25, 35] | $TM_{31}$ | $TM_{31}$ | $TM_{31}$ | $TM_{41}$ | $TM_{41}$ | $TM_{41}$ |
| (20, 25] | $TM_{21}$ | $TM_{31}$ | $TM_{31}$ | $TM_{31}$ | $TM_{41}$ | $TM_{41}$ |
| (15, 20] | $TM_{21}$ | $TM_{21}$ | $TM_{31}$ | $TM_{31}$ | $TM_{31}$ | $TM_{41}$ |
| (10, 15] | $TM_{21}$ | $TM_{21}$ | $TM_{21}$ | $TM_{31}$ | $TM_{31}$ | $TM_{41}$ |
| (7, 10] | $TM_{21}$ | $TM_{21}$ | $TM_{21}$ | $TM_{21}$ | $TM_{31}$ | $TM_{31}$ |
| (4, 7] | $TM_{21}$ | $TM_{21}$ | $TM_{21}$ | $TM_{21}$ | $TM_{21}$ | $TM_{31}$ |
| (1, 4] | $TM_{21}$ | $TM_{21}$ | $TM_{21}$ | $TM_{21}$ | $TM_{21}$ | $TM_{21}$ |

REFERENCE CONFIGURATION $_{31}$

| $D_\lambda$ \ SNR | 0 dB | 5 dB | 10 dB | 15 dB | 20 dB | 25 dB |
|---|---|---|---|---|---|---|
| (50, ∞) | $TM_{21}$ | $TM_{31}$ | $TM_{41}$ | $TM_{41}$ | $TM_{41}$ | $TM_{41}$ |
| (35, 50] | $TM_{21}$ | $TM_{31}$ | $TM_{41}$ | $TM_{41}$ | $TM_{41}$ | $TM_{41}$ |
| (25, 35] | $TM_{21}$ | $TM_{21}$ | $TM_{31}$ | $TM_{41}$ | $TM_{41}$ | $TM_{41}$ |
| (20, 25] | $TM_{21}$ | $TM_{21}$ | $TM_{21}$ | $TM_{31}$ | $TM_{31}$ | $TM_{41}$ |
| (15, 20] | $TM_{21}$ | $TM_{21}$ | $TM_{21}$ | $TM_{31}$ | $TM_{31}$ | $TM_{31}$ |
| (10, 15] | $TM_{21}$ | $TM_{21}$ | $TM_{21}$ | $TM_{21}$ | $TM_{21}$ | $TM_{21}$ |
| (5, 10] | $TM_{21}$ | $TM_{21}$ | $TM_{21}$ | $TM_{21}$ | $TM_{21}$ | $TM_{21}$ |
| (3, 5] | $TM_{21}$ | $TM_{21}$ | $TM_{21}$ | $TM_{21}$ | $TM_{21}$ | $TM_{21}$ |
| (1, 3] | $TM_{21}$ | $TM_{21}$ | $TM_{21}$ | $TM_{21}$ | $TM_{21}$ | $TM_{21}$ |

REFERENCE CONFIGURATION $_{21}$

| $D_\lambda$ \ SNR | 0 dB | 5 dB | 10 dB | 15 dB | 20 dB | 25 dB |
|---|---|---|---|---|---|---|
| (40, ∞) | $TM_{31}$ | $TM_{31}$ | $TM_{31}$ | $TM_{41}$ | $TM_{41}$ | $TM_{41}$ |
| (30, 40] | $TM_{31}$ | $TM_{31}$ | $TM_{41}$ | $TM_{41}$ | $TM_{41}$ | $TM_{41}$ |
| (25, 35] | $TM_{31}$ | $TM_{31}$ | $TM_{31}$ | $TM_{41}$ | $TM_{41}$ | $TM_{41}$ |
| (20, 25] | $TM_{21}$ | $TM_{31}$ | $TM_{31}$ | $TM_{31}$ | $TM_{41}$ | $TM_{41}$ |
| (15, 20] | $TM_{21}$ | $TM_{21}$ | $TM_{31}$ | $TM_{31}$ | $TM_{31}$ | $TM_{41}$ |
| (10, 15] | $TM_{21}$ | $TM_{21}$ | $TM_{21}$ | $TM_{31}$ | $TM_{31}$ | $TM_{41}$ |
| (7, 10] | $TM_{21}$ | $TM_{21}$ | $TM_{21}$ | $TM_{21}$ | $TM_{31}$ | $TM_{31}$ |
| (4, 7] | $TM_{21}$ | $TM_{21}$ | $TM_{21}$ | $TM_{21}$ | $TM_{21}$ | $TM_{31}$ |
| (1, 4] | $TM_{21}$ | $TM_{21}$ | $TM_{21}$ | $TM_{21}$ | $TM_{21}$ | $TM_{21}$ |

REFERENCE CONFIGURATION $_{41}$

| $D_\lambda$ \ SNR | 0 dB | 5 dB | 10 dB | 15 dB | 20 dB | 25 dB |
|---|---|---|---|---|---|---|
| (50, ∞) | $TM_{31}$ | $TM_{41}$ | $TM_{41}$ | $TM_{41}$ | $TM_{41}$ | $TM_{41}$ |
| (35, 50] | $TM_{31}$ | $TM_{31}$ | $TM_{41}$ | $TM_{41}$ | $TM_{41}$ | $TM_{41}$ |
| (25, 35] | $TM_{21}$ | $TM_{31}$ | $TM_{31}$ | $TM_{41}$ | $TM_{41}$ | $TM_{41}$ |
| (20, 25] | $TM_{21}$ | $TM_{21}$ | $TM_{21}$ | $TM_{31}$ | $TM_{31}$ | $TM_{41}$ |
| (15, 20] | $TM_{21}$ | $TM_{21}$ | $TM_{21}$ | $TM_{21}$ | $TM_{31}$ | $TM_{31}$ |
| (10, 15] | $TM_{21}$ | $TM_{21}$ | $TM_{21}$ | $TM_{21}$ | $TM_{21}$ | $TM_{31}$ |
| (5, 10] | $TM_{21}$ | $TM_{21}$ | $TM_{21}$ | $TM_{21}$ | $TM_{21}$ | $TM_{21}$ |
| (3, 5] | $TM_{21}$ | $TM_{21}$ | $TM_{21}$ | $TM_{21}$ | $TM_{21}$ | $TM_{21}$ |
| (1, 3] | $TM_{21}$ | $TM_{21}$ | $TM_{21}$ | $TM_{21}$ | $TM_{21}$ | $TM_{21}$ |

| SNR<br>$D_\sigma$ | 0 dB | 5 dB | 10 dB | 15 dB | 20 dB | 25 dB |
|---|---|---|---|---|---|---|
| (50, ∞) | $TM_{31}$ | $TM_{41}$ | $TM_{41}$ | $TM_{41}$ | $TM_{41}$ | $TM_{41}$ |
| (35, 50] | $TM_{31}$ | $TM_{31}$ | $TM_{41}$ | $TM_{41}$ | $TM_{41}$ | $TM_{41}$ |
| (25, 35] | $TM_{21}$ | $TM_{31}$ | $TM_{31}$ | $TM_{41}$ | $TM_{41}$ | $TM_{41}$ |
| (20, 25] | $TM_{21}$ | $TM_{21}$ | $TM_{21}$ | $TM_{31}$ | $TM_{31}$ | $TM_{41}$ |
| (15, 20] | $TM_{21}$ | $TM_{21}$ | $TM_{21}$ | $TM_{21}$ | $TM_{31}$ | $TM_{31}$ |
| (10, 15] | $TM_{21}$ | $TM_{21}$ | $TM_{21}$ | $TM_{21}$ | $TM_{21}$ | $TM_{31}$ |
| (5, 10] | $TM_{21}$ | $TM_{21}$ | $TM_{21}$ | $TM_{21}$ | $TM_{21}$ | $TM_{21}$ |
| (3, 5] | $TM_{21}$ | $TM_{21}$ | $TM_{21}$ | $TM_{21}$ | $TM_{21}$ | $TM_{21}$ |
| (1, 3] | $TM_{21}$ | $TM_{21}$ | $TM_{21}$ | $TM_{21}$ | $TM_{21}$ | $TM_{21}$ |

*FIG. 14A*

| SNR DS [dB] | 0 dB | 5 dB | 10 dB | 15 dB | 20 dB | 25 dB |
|---|---|---|---|---|---|---|
| (0, 10] | $TM_{31}$ | $TM_{41}$ | $TM_{41}$ | $TM_{41}$ | $TM_{41}$ | $TM_{41}$ |
| (10, 14] | $TM_{31}$ | $TM_{31}$ | $TM_{41}$ | $TM_{41}$ | $TM_{41}$ | $TM_{41}$ |
| (14, 17] | $TM_{21}$ | $TM_{31}$ | $TM_{31}$ | $TM_{41}$ | $TM_{41}$ | $TM_{41}$ |
| (17, 19] | $TM_{21}$ | $TM_{21}$ | $TM_{31}$ | $TM_{31}$ | $TM_{41}$ | $TM_{41}$ |
| (15, 20] | $TM_{21}$ | $TM_{21}$ | $TM_{21}$ | $TM_{31}$ | $TM_{31}$ | $TM_{31}$ |
| (19, ∞] | $TM_{21}$ | $TM_{21}$ | $TM_{21}$ | $TM_{21}$ | $TM_{21}$ | $TM_{31}$ |

*FIG. 14B*

SYSTEMS AND METHODS FOR SELECTING RECONFIGURABLE ANTENNAS IN MIMO SYSTEMS

CROSS REFERENCE TO RELATED APPLICATIONS

This application is the National Stage of International Application No. PCT/US2010/021917, filed Jan. 25, 2010, which claims the benefit of U.S. Provisional Patent Application Ser. No. 61/147,365 filed Jan. 26, 2009, the disclosure of which is hereby incorporated by reference as if set forth in its entirety herein.

STATEMENT OF FEDERALLY SPONSORED RESEARCH

Portions of the disclosure herein may have been supported in part by a grant from the National Science Foundation, Grant Nos. CNS-0322795, CNS-0322797 and ECS-0524200. The United States Government may have certain rights in the invention.

TECHNICAL FIELD

The present invention relates generally to the field of multi-element antenna systems. Specifically, the present invention relates to systems and methods for efficiently using multi-element reconfigurable antennas in MIMO, SIMO and MISO systems.

BACKGROUND OF THE INVENTION

Recent studies have shown that employing reconfigurable antennas can improve the gains offered by Multiple Input Multiple Output (MIMO), Single Input Multiple Output (SIMO) and Multiple Input Single Output (MISO) systems as explained in "Design and evaluation of a reconfigurable antenna array for MIMO systems," IEEE Transactions on Antennas and Propagation, vol. 56, no. 3, 2008, by D. Piazza, N.J. Kirsch, A. Forenza, R. W. Heath Jr., and K. R. Dandekar; "A MIMO system with multifunctional reconfigurable antennas," IEEE Antennas and Wireless Propagation Letters, vol. 5, no. 31, pp. 463-466, 2006, by B. A. Cetiner, E. Akay, E. Sengul, and E. Ayanoglu; "Multifunctional reconfigurable MEMS integrated antennas for adaptive MIMO systems," IEEE Communications Magazine, vol. 42, no. 12, pp. 62-70, 2004, by B. A. Cetiner, H. Jafarkhani, Jiang-Yuan Qian, Hui Jae Yoo, A. Grau, and F. De Flaviis; "Maximizing MIMO capacity in sparse multipath with reconfigurable antenna' arrays," IEEE Journal of Selected Topics in Signal Processing, vol. 1, no. 1, pp. 156-166, 200, by A. M. Sayeed and V. Raghavan; and "Two port reconfigurable circular patch antenna for MIMO systems," Proceedings of the European Conference on Antennas and Propagation, EUCAP, 2007 by D. Piazza, P. Mookiah, M. D'Amico, and K. R. Dandekar. These antennas adaptively change their electrical and radiation properties according to the propagation characteristics of the wireless channel in order to provide a strong channel between the transmitting and receiving antennas in a given communication system.

To optimally use such reconfigurable antennas it is necessary to know the channel response between the transmitter and the receiver for each antenna configuration as shown in "A reconfigurable multiple-input multiple-output communication system," IEEE Transactions on Wireless Communications, vol. 7, no. 5, 2008, by A. Grau, H. Jafarkhami, and F. De Flaviis. However, estimating the channel response for each antenna configuration at the transmitter and at the receiver as described in the above-mentioned paper has been demonstrated to be power consuming and to have a detrimental effect on the performance of the reconfigurable MIMO, MISO and SIMO systems. The negative effect of channel estimation on the performance of the communication system increases proportionally with the number of antenna configurations, reaching the point where the losses, caused by imperfect channel estimation, may be higher than the capacity gain offered by reconfigurable antennas.

In order to overcome this channel estimation problem, a method is proposed herein that allows both linear and nonlinear multi-element reconfigurable antennas to select the antenna configuration at the receiver without any extra power consumption and modifications to the data frame of conventional, non-reconfigurable MIMO, SIMO or MISO systems. This configuration selection scheme does not aim to maximize the throughput for each particular channel realization, but it selects the antenna configuration that, on average, increases the spectral efficiency of the communication link.

The adaptive algorithm presented below is shown to be effective for pattern reconfigurable antennas, though its use can also be extended to other classes of antennas. Pattern reconfigurable antennas are selected because of their advantages in MIMO, SIMO or MISO communications with respect to antennas that exploit space or polarization diversity. Pattern diversity antennas, similarly to polarization diversity antennas, allow system designers to reduce the antenna space occupied on a communication device, solving the size and cost constraints that prevent the antennas from being placed far apart in conventional multi element antenna systems as taught in "Benefit of pattern diversity via two-element array of circular patch antennas in indoor clustered MIMO channels," IEEE Transactions on Communications, vol. 54, no. 5, pp. 943-954, 2006, by A. Forenza and R. W. Heath Jr.

Also, unlike polarization reconfigurable antennas, pattern reconfigurable antennas can be effectively used without the need for switching antenna configuration at the transmitter and at the receiver simultaneously for polarization alignment. Moreover, pattern reconfigurable antennas, unlike polarization reconfigurable antennas, allow for the generation of an ideal infinitive number of perfectly uncorrelated patterns per antenna element in order to optimally tune the wireless channel for the highest spectral efficiency. A configuration selection scheme is proposed in accordance with the invention that analyzes the performance achievable with reconfigurable circular patch antennas as described in "Two port reconfigurable circular patch antenna for MIMO systems," Proceedings of the European Conference on Antennas and Propagation, EUCAP, 2007, authored by D. Piazza, P. Mookiah, M. D'Amico, and K. R. Dandekar. As described in the D. Piazza paper, these antennas are capable of dynamically changing their patterns by varying the radius of the circular patch. An analysis of the performance of these Reconfigurable Circular Patch Antennas (RCPAs), in terms of ergodic channel capacity and Bit Error Rate (BER), is conducted using the clustered channel model as taught in "TGn channel models," IEEE 802.11-03/940r4, 2004 by V. Erceg et al.

Through this approach the array configuration selection is directly linked to i) the spatial characteristics of the wireless channel (angle spread of the power angular spectrum), ii) the levels of pattern diversity existing between the elements of the reconfigurable array, iii) the differences in radiation efficiency and input impedance between the various antenna configurations, and iv) the average system Signal-To-Noise- Ratio (SNR). An antenna selection scheme optimized for multi-element reconfigurable antennas is desirable and is described herein.

SUMMARY

The proposed multi-element antenna selection scheme in accordance with the invention selects the antenna array configuration for a multi-element reconfigurable transmitter and/or receiver antenna. The system includes at least one of a transmitter antenna array and a receiver antenna array comprising multiple reconfigurable elements and a processor that implements software for the selection of an antenna array configuration and also builds a look-up table for at least one antenna array configuration. Connective means such as PIN diodes, MEMS switches, FET transistors, variable inductors and/or variable capacitors are provided that can be adjusted by the processor to reconfigure the antenna array configuration. The reconfigurable antenna array configuration can be, but is not limited to, a circular patch antenna array. The receiver antenna array also can use linear or non linear receivers to perform channel estimation. The transmit power can be equally distributed amongst array elements of the transmitter antenna array or it can be adaptively distributed among the array elements of the transmitter antenna array.

The multiple reconfigurable elements can be used in various wireless communication systems including, but not limited to: systems employing beam forming, spatial multiplexing, space time diversity transmission schemes, wireless local area networks, wireless personal area networks, wireless ad hoc networks, sensor networks, wireless body area networks, radar systems, satellite communications networks, 3G cellular networks, and/or 4G cellular networks.

The processor builds a look-up table of antenna array configurations which includes, but is not limited to, values representative of signal to noise ratio (SNR), angular spread (AS), reciprocal condition number ($D_\sigma$), reciprocal condition number of the transmit/receive correlation matrices ($D_\lambda$), and delay spread (DS). Additional elements that can be used to build the look-up table include an electromagnetic clustered channel model, an electromagnetic ray tracing simulation, channel measurements or a system performance metric such as channel capacity, data transfer rate, bit error rate, packet error rate, or amount of transmit power. The values can be estimated from information received in data packets of which part of each data packet is allocated for channel estimation.

The values for each array element are estimated for the various antenna array configurations. The antenna array configuration is set for the transmitter and/or the receiver antenna. The signal correlation for selected array configuration can also be determined and used to determine the channel reciprocal condition number $D_\lambda$. The channel transfer matrix for the current array configuration can be determined and used to determine the channel reciprocal condition number $D_\sigma$.

The look-up table can be selected based on the array configuration used to build the look-up table. The look-up table can also be selected based on the direct measurement of SNR. The AS may be estimated using the reciprocal condition number information.

The array configuration preferably can be set to a reconfigurable array with total radiation pattern that guarantees quasi omni-directional coverage in a plane of an incoming signal. The selected antenna array configuration so selected can affect the shape of a radiation pattern, polarization of the radiation pattern, and/or separation between array elements of the antenna array.

BRIEF DESCRIPTION OF THE DRAWINGS

FIGS. 1(a) and 1(b) illustrate schematics of the Reconfigurable Circular Patch Antenna (RCPA) with two (FIG. 1(a)) and three (FIG. 1(b)) antenna configurations, while FIG. 1(c) illustrates radiation patterns excited in the azimuthal plane at the two ports of the RCPA for different electromagnetic modes.

FIG. 3(a) illustrates channel capacity curves for three different antenna configurations as a function of the angle spread (AS) for a 2×2 MIMO system employing the RCPA-1 at the receiver, while

FIG. 8(a) illustrates an achievable channel capacity as a function of the angle spread (AS) for a 2×2 MIMO system, and FIG. 8(b) illustrates the percentage capacity improvement as a function of AS for the same MIMO system that employs RCPA-1 at the receiver.

FIG. 12 illustrates a sample look up table that can be used to select the antenna configuration knowing the SNR and $D_\lambda$ for reference configuration $TM_{21}$.

FIG. 13 illustrates a group of sample look up tables for different reference antenna configurations.

FIG. 14 illustrates sample look up tables that can be used to select the antenna configuration knowing (a) the SNR and $D_\lambda$ for reference configuration $TM_{21}$ and (b) the SNR and DS for reference configuration $TM_{21}$.

DETAILED DESCRIPTION OF ILLUSTRATIVE EMBODIMENTS

Figure 2:
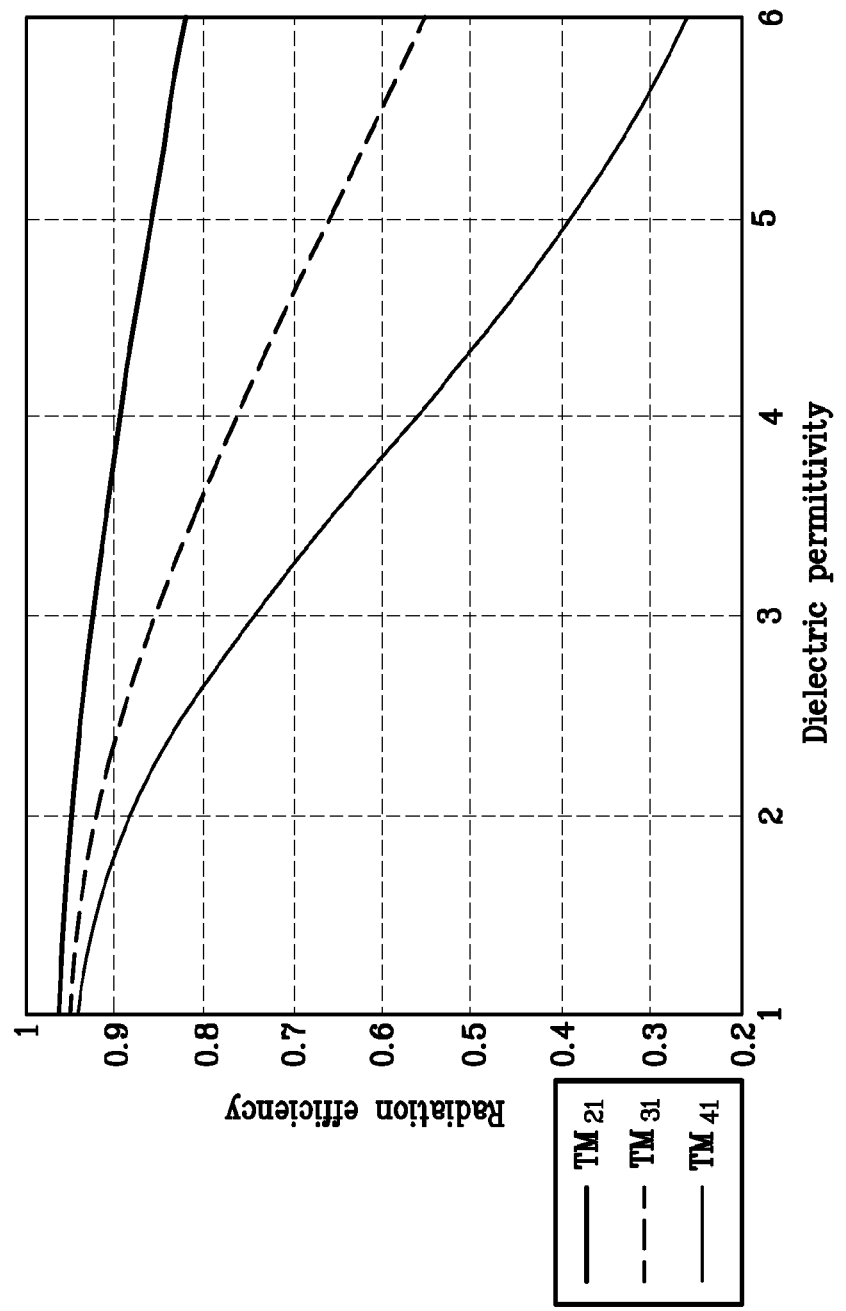
FIG. 2 illustrates RCPA radiation efficiency for different antenna configurations as a function of the substrate dielectric permittivity.

SIMO and MISO systems employ multi element antennas only at the receiver and at the transmitter respectively, while MIMO systems employ multi element antennas at both ends of the communication link. In the following description, a MIMO communication system is considered as an exemplary embodiment, but those skilled in the art will also appreciate that all the results apply also to SIMO and MISO systems.

Unlike conventional non-reconfigurable multi-element antenna systems, in a reconfigurable MIMO system, each antenna element of the transmitting/receiving array is capable of changing its radiation pattern characteristics (i.e. pattern, polarization or both). Changing the radiation properties of each antenna element has been shown to be an effective technique to adapt to the changing conditions of the wireless channel in between the transmitter and the receiver. By properly selecting the array configurations, it is possible to choose the channel scenario that allows for the highest throughput.

MIMO systems, employing reconfigurable arrays, are capable of P different configurations. Assuming a flat fading channel, the signal collected at the receiver is related to the signal outgoing from the transmitter through the relation:

$$y_{p,q} = H_{p,q} x_{p,q} + n_{p,q}$$

where $y_{p,q} \in C^{N \times 1}$ is the signal vector at the receiver array, $x_{p,q} \in C^{M \times 1}$ is the signal vector at the transmit antenna array, $n_{p,q} \in C^{N \times 1}$ is the complex additive white Gaussian noise (AWGN) vector with variance $\sigma_n^2$ and $H_{p,q} \in C^{N \times M}$ is the channel transfer matrix. The subscripts p-th and q-th refer to the array configuration employed at the transmitter and receiver multi element antenna respectively.

According to the Kronecker model, the transfer channel matrix $H_{p,q}$, is defined as:

$$H_{p,q} = R_{RXq}^{1/2} H_w R_{TXp}^{1/2}$$

where RTXp and RRXq denote respectively the receive and transmit spatial correlation matrices for the p-th configuration of the receiving array and for the q-th configuration of the transmitting array, respectively. $H_w \in C^{N \times M}$ is a matrix of complex Gaussian fading coefficients. To perform estimation of the channel response, $H_{p,q}$, a pilot assisted estimation is considered that uses minimum mean square error (MMSE) receivers. A training sequence composed of L symbols is transmitted with a period of K symbols, and used by the receiver to estimate the channel response. It is common that the pilot signals assigned to the different transmit antennas are mutually orthogonal. This assumption implies that the total transmitted data per pilot sequence is equal to K–LM symbols.

The transmitted power is uniformly distributed across the M transmit antenna elements. The amplitude of the data symbol can then be expressed as:

$$A = \sqrt{\frac{K}{((K-LM) + \alpha^2 L)M} \frac{P_{av}}{M}}$$

where Pav is the average transmit power from all transmit antennas and $\alpha$ is a parameter that relates the amplitude of the data symbols to the amplitude of the training symbols $A_p$, so that $A_p = \alpha A$. The percentage of power allocated to the training symbols, $\alpha$ is then given by:

$$\mu = \frac{L\alpha^2}{(K-LM) + L\alpha^2} 100[\%]$$

For such communication systems, assuming perfect knowledge of the spatial correlation information at the transmitter and at the receiver, a lower bound of the achievable ergodic channel capacity may be defined as:

$$C \geq \frac{K-LM}{K} E_{\hat{H}_{p,q}} \left[ \log_2 \det \left( 1 + \frac{P_{av}}{M} \hat{H}_{p,q} \hat{H}_{p,q}^\dagger (\Upsilon + \sigma_n^2 I)^{-1} \right) \right]$$

where $\hat{H}_{p,q}$ is the estimated transfer channel matrix and $\Upsilon$ is the covariance matrix of the random vector $H_e x_p$, with $H_e$ being the MMSE estimation error on $H_w$ (i.e. $H_e = \hat{H}_w - H_w$); I is a N×N identity matrix and (†) denotes a complex conjugate transpose operation. Note that the term $$\frac{K-LM}{K}$$

is introduced because L temporal signatures per each transmit antenna are allocated to the pilot. The covariance matrix, $\alpha$, is defined as:

$$\Upsilon = \sigma_{H_e}^2 P_{av} R_{RX_q}$$

where $\sigma_{H_e}^2$ is the variance of the MMSE estimation error on $H_w$. For this communication system $\sigma_{H_e}^2$ is defined as:

$$\sigma_{H_e}^2 = \left( \frac{1}{1 + \frac{\rho_p L_p}{M}} \right)$$

where $$\rho_p = \frac{\alpha A}{\sigma_n^2}$$

and $L_p$ is the length of the sub-training sequence of L, allocated to estimate the channel transfer matrix for a particular antenna configuration at the transmitter and at the receiver $L_p \in (0, L]$). Note that as $\alpha$ approaches 1 the ergodic channel capacity is that of a system that assumes perfect channel state information at the receiver (p-CSI).

One preferred embodiment of reconfigurable antennas includes reconfigurable circular patch antennas (RCPAs). The connective means used to reconfigure the RCPA can include setting PIN diodes, MEMS switches, FET transistors, variable inductors and/or variable capacitors. RCPAs are antennas that can dynamically change the shape of their radiation patterns by varying the size of the circular patch. Each antenna has two feed points and acts as a two element array. As depicted in FIG. 1, the two feed points on the antenna structure are separated such that the radiation patterns excited at the two ports (port 1 and port 2) are orthogonal to each other. By simultaneously turning on and off the switches located radially on the antenna, it is possible to vary the current distribution on the antenna structure and excite different TM electromagnetic modes, each corresponding to a particular shape of radiation pattern. The electric field components excited in the far field by each port of the antenna for the n-th TM electromagnetic mode are defined as a function of the circular patch antenna radius, $\rho$, as:

$$E_{\theta,1}^{(n)}(\phi, \theta) = e^{\frac{jn\pi}{2}} \frac{e^{-jk_0 d}}{d} \frac{V_0}{2} k_0 \rho [J_{n+1}(k_0 \rho \sin\theta) - J_{n-1}(k_0 \rho \sin\theta)] \cos[n(\phi - \phi_0)]$$

-continued $$E_{\theta,1}^{(n)}(\phi, \theta) = -e^{\frac{jn\pi}{2}} \frac{e^{-jk_0 d}}{d} \frac{V_0}{2}$$

$$k_0\rho[J_{n+1}(k_0\rho\sin\theta) - J_{n-1}(k_0\rho\sin\theta)]\cos\theta\sin[n(\phi - \phi_0)]$$

$$E_{\theta,2}^{(n)}(\phi, \theta) = e^{\frac{jn\pi}{2}} \frac{e^{-jk_0 d}}{d} \frac{V_0}{2} k_0\rho[J_{n+1}(k_0\rho\sin\theta) - J_{n-1}(k_0\rho\sin\theta)]$$

$$\sin[n(\phi - \phi_0)]$$

$$E_{\theta,2}^{(n)}(\phi, \theta) = -e^{\frac{jn\pi}{2}} \frac{e^{-jk_0 d}}{d} \frac{V_0}{2} k_0\rho[J_{n+1}(k_0\rho\sin\theta) + J_{n-1}(k_0\rho\sin\theta)]$$

$$\cos\theta\cos[n(\phi - \phi_0)]$$

where $E_{\theta,<1,2>}$ and $E_{\phi<1,2>}$ are the $\theta$ and $\phi$ components of the electric fields excited at port 1 and port 2 of the RCPA. $J_n(k_0\rho \sin\theta)$ is the Bessel function of the first kind and order n; fi0 is the reference angle corresponding to the feed point location on the antenna; $V_0$ is the edge voltage at $\phi=0$; $k_0$ is the wave number; and d is the distance from the antenna. Varying the radius of the antenna, different electromagnetic modes can be excited according to:

$$\rho = \frac{\chi_n' \lambda}{2\pi\sqrt{\varepsilon_r}}$$

where $\in_r$ is the dielectric permittivity of the substrate, $\lambda$ is the wavelength, and $X_n'$ is the first zero of the derivative of the Bessel function Jn.

This embodiment includes RCPAs capable of exciting three different electromagnetic modes (i.e. configurations) at both ports: $TM_{21}$, $TM_{31}$ and $TM_{41}$. The radiation patterns that are excited in the azimuthal plane with such RCPAs are shown in FIG. 1(c). The patterns excited at the two ports of the RCPA, for the same antenna configuration, are orthogonal to each other and the variations between radiation patterns of different RCPA modes occur in the number of lobes and in their beam width. To quantify the level of diversity existing between radiation patterns excited at the ports of the RCPA, one may use the spatial correlation coefficient, $\hat{r}_{j,k,l,m}$, defined as:

$$\hat{r}_{j,k,l,m} = \frac{\int_{4\pi} P(\Omega)\underline{E}_{j,k}(\Omega)\underline{E}_{l,m}(\Omega)d(\Omega)}{\left[\int_{4\pi} P(\Omega)\underline{E}_{j,k}(\Omega)|^2 d\Omega \int_{4\pi} P(\Omega)\underline{E}_{l,m}(\Omega)|^2 d\Omega\right]^{1/2}}$$

where j and l define the array port and k and m the antenna configuration at the port j and l respectively. $\underline{E}_{j,k}(\Omega)$ is the radiation pattern of the configuration k at port j over the solid angle $\Omega=(\phi, \theta)$. $P(\Omega)$ is a probability density function that describes the incident multipath field distribution. For a rich scattering environment, $P(\Omega)$ is uniformly distributed over $$\left(\text{i.e. } P(\Omega) = \frac{1}{4\pi}\right).$$

Table I shows the level of diversity existing between radiation patterns excited at the two ports of the array for each antenna configuration ($\hat{r}_{j,k,l,m}$), while Table II reports the level of diversity existing between the different antenna configurations ($\hat{r}_{j,k,l,m}$)

TABLE I

SPATIAL CORRELATION BETWEEN PATTERNS GENERATED AT TWO DIFFERENT PORTS OF THE RCPA FOR THE SAME CONFIGURATION - $\hat{r}_{1,k,2,k}$

| $\hat{r}_{1,TM_{21},2,TM_{21}}$ | $\hat{r}_{1,TM_{31},2,TM_{31}}$ | $\hat{r}_{1,TM_{41},2,TM_{41}}$ |
|---|---|---|
| 0.63 | 0.63 | 0.63 |

With this embodiment it is observed that the correlation values between radiation patterns excited at the two ports of the array are small enough for all the configurations (≤0:7) to provide significant diversity gain. Table II shows that the correlation between different configurations is about 0:8 for all the states. Although this value is large, the differences between the array configurations are high enough to provide an improvement in terms of spectral efficiency and BER with respect to non reconfigurable circular patch antennas.

TABLE II

SPATIAL CORRELATION BETWEEN PATTERNS GENERATED AT THE SAME PORT OF THE RCPA - $\hat{r}_{1,k,2,k}$

|  | $\underline{E}_{1,TM_{21}}$ | $\underline{E}_{1,TM_{31}}$ | $\underline{E}_{1,TM_{41}}$ |
|---|---|---|---|
| $\underline{E}_{1,TM_{21}}$ | 1 | 0.80 | 0.85 |
| $\underline{E}_{1,TM_{31}}$ | 0.80 | 1 | 0.81 |
| $\underline{E}_{1,TM_{41}}$ | 0.85 | 0.81 | 1 |

Differences between the various antenna configurations (and electromagnetic modes) exists not only in the shape of the excited radiation patterns, but also in the level of radiation efficiency, η, defined as:

$$\eta = \frac{Q_T}{Q_R}$$

where $Q_T$ is the antenna total quality factor and $Q_R$ is the radiation quality factor; $Q_T$ takes into account dielectric, conduction and radiation losses while $Q_R$ is a figure of merit for only the radiation losses. They are defined, for a circular patch antenna, as:

$$Q_T = \left(\frac{1}{h\sqrt{\pi\mu f\sigma}} + \tan\delta + \frac{h\mu f(k_0\rho)^2 I_1}{240[x_n'^2 - n^2]}\right)^{-1}$$

$$Q_R = \left(\frac{240[x_n'^2 - n^2]}{h\mu f(k_0\rho)^2 I_1}\right)$$

where f is the frequency of operation, μ is the substrate dielectric permeability, h is the substrate thickness, and σ is the conductivity of the material used to build the circular patch. tan δ is a figure of merit that takes into account the substrate losses and $I_1$ is defined as:

$$I_1 = \int_0^\pi [(J_{n+1}(k_0\rho\sin\theta) - J_{n-1}(k_0\rho\sin\theta))^2 + $$

$$(\cos\theta)^2 (J_{n+1}(k_0\rho\sin\theta) + J_{n-1}(k_0\rho\sin\theta))^2]\sin\theta d\theta$$

In FIG. 2 the radiation efficiency is reported as a function of the dielectric permittivity for different configurations of a RCPA matched at 5:2 GHz and built on a substrate of thickness h=0:159 mm and tan δ=0:0009. It can be observed that the level of radiation efficiency is different for each antenna configuration, as is true for most of the electrically reconfigurable antennas proposed in the literature. For the RCPAs it is noted that the lower electromagnetic modes are more efficient than the higher modes. Also, when the dielectric permittivity value increases, the radiation efficiency decreases. Two preferred embodiments of RCPAs for the selection algorithm differ in antenna substrate and level of radiation efficiency. A summary of the main characteristics of these two antennas is reported in Table III below.

Each cluster is characterized by a mean angle of arrival (AOA)$\Omega_c$, where $\Omega_c=(\phi_c, \theta)$ represents the solid angle consisting of azimuth ($\phi_c$) and elevation ($\theta_c$) components. Depending on the system bandwidth, the excess delay across different propagation paths may not be resolvable. In this case, multiple AOAs are defined with an offset $\phi$ with respect to the mean AOA of the cluster ($\phi_c$). This angle of arrival is generated according to a certain probability density function (PDF) that models the power angular spectrum (PAS). The variance of the PAS is a measure of the angle spread (AS), $\sigma_\phi$, of the cluster.

PAS is defined as $P(\Omega)=P_\phi(\Omega)+P_\theta(\Omega)$, where $P_\phi$ and $P_\theta$ are the angular power densities of the $\hat{\phi}$ and $\hat{\theta}$ components of the incident field, respectively. It is also assumed that most of the scattered power propagates over the azimuth directions. Therefore $P(\Omega)=Q^*(\Omega)^*\delta(\phi-\phi_c)\delta(\theta-\pi/2)$, where * denotes the convolution operator and $Q(\Omega)$ is generated according to the truncated Laplacian distribution.

The spatial correlation between the k-th and m-th pattern configuration excited at the j-th and l-th ports of multi element antennas, including the effect of the wireless channel, may be defined as:

$$r_{j,k,l,m} = \sqrt{(1-|S_{11j}|^2)\eta_{j,k}(1-|S_{11l}|^2)\eta_{l,m}} \times \hat{r}_{j,k,l,m} ==$$

$$\sqrt{(1-|S_{11j}|^2)\eta_{j,k}(1-|S_{11l}|^2)\eta_{l,m}} \times \frac{\int_{4\pi} P(\Omega)E_{j,k}(\Omega)E_{l,m}^\dagger(\Omega)d\Omega}{\int_{4\pi} P(\Omega)|E_{ref}(\Omega)|^2 d\Omega}$$

where $$\left[\int_{4\pi} P(\Omega)|E_{j,k}(\Omega)|^2 d\Omega \int_{4\pi} P(\Omega)|E_{l,m}(\Omega)|^2 d\Omega\right]^{1/2} = \int_{4\pi} P(\Omega)|E_{ref}(\Omega)|^2 d\Omega,$$

is set with $\underline{E}_{ref}(\Omega)$ being the electric field of a reference antenna configuration that is used as normalization factor for the spatial correlation coefficient. $S_{11}$ is the voltage reflection coefficients at the antenna input ports and η is the antenna radiation efficiency.

The theoretical spatial correlation coefficients of a two port RCPA can be expressed as:

$$r_{l,m,l,m}(\phi_c, \sigma_\phi) = \frac{(1-|S_{11_{l,m}}|)\eta_{l,m}}{(1-e^{-\sqrt{2}\pi/\sigma_\phi})} \frac{(n\sigma_\phi)^2}{1+2(n\sigma_\phi)^2} \times$$

$$\left[1 - e^{-\sqrt{2}\pi/\sigma_\phi} + \frac{\sin^2(n\phi_c)}{(n\sigma_\phi)^2}(1 - e^{-\sqrt{2}\pi/\sigma_\phi}\cos(n\pi))\right]$$

$$r_{j,k,j,k}(\phi_c, \sigma_\phi) = \frac{\sqrt{(1-|S_{11_{j,k}}|)\eta_{j,k}}}{(1-e^{-\sqrt{2}\pi/\sigma_\phi})} \frac{(n\sigma_\phi)^2}{1+2(n\sigma_\phi)^2} \times \times \left[\right.$$

$$\left. 1 - e^{-\sqrt{2}\pi/\sigma_\phi} + \frac{\sin^2(n\phi_c)}{(n\sigma_\phi)^2}(1 - e^{-\sqrt{2}\pi/\sigma_\phi}\cos(n\pi))\right]$$

$$r_{j,k,l,m}(\phi_c, \sigma_\phi) = \frac{\sqrt{(1-|S_{11_{l,m}}|)\eta_{l,m}(1-|S_{11_{j,k}}|)\eta_{j,k}}}{2} \frac{(\sin n\phi_c)}{1+2(n\sigma_\phi)^2}$$

where it is assumed $\int_{4\pi} P(\Omega)|\underline{E}_{ref}(\Omega)|^2 d\Omega=1$. The input impedance, efficiency and AS of the power angular spectrum describing the wireless channel act as scaling factors of the spatial correlation coefficient. Knowing the spatial correlation coefficient for each antenna configuration allows one to compute the transfer channel matrix $H_{p,q}$. Only single sided correlated MIMO channels are considered herein. In particular, RCPAs are used only at the receiver while at the transmitter it is assumed RTX=I. This assumption is made because one may present an antenna configuration selection technique for the receiver, independently from the transmitter. The fact that RTX=I does not affect the following analysis, which would not change for RTX 6=I.

The ergodic channel capacity achievable for each RCPA configuration can then be calculated for the case of perfect channel state information at the Receiver ($\alpha \to \infty$), as discussed below. The following analysis is performed in the single cluster channel model and the spatial correlation information is determined, using configuration $TM_{21}$ as a reference antenna.

Figure 3A:
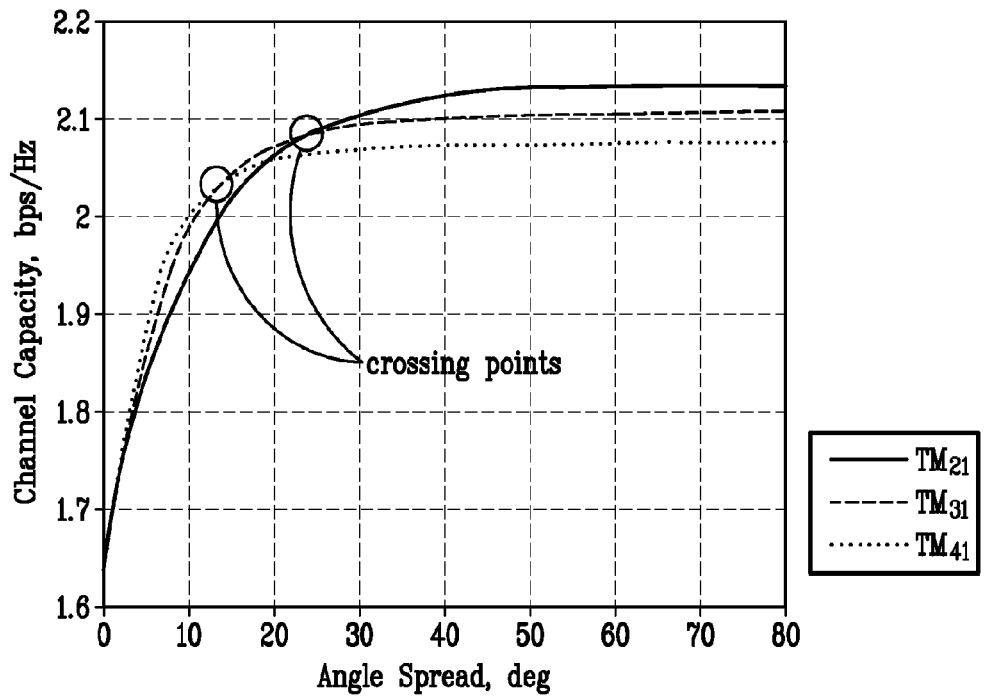
Figure 4A:
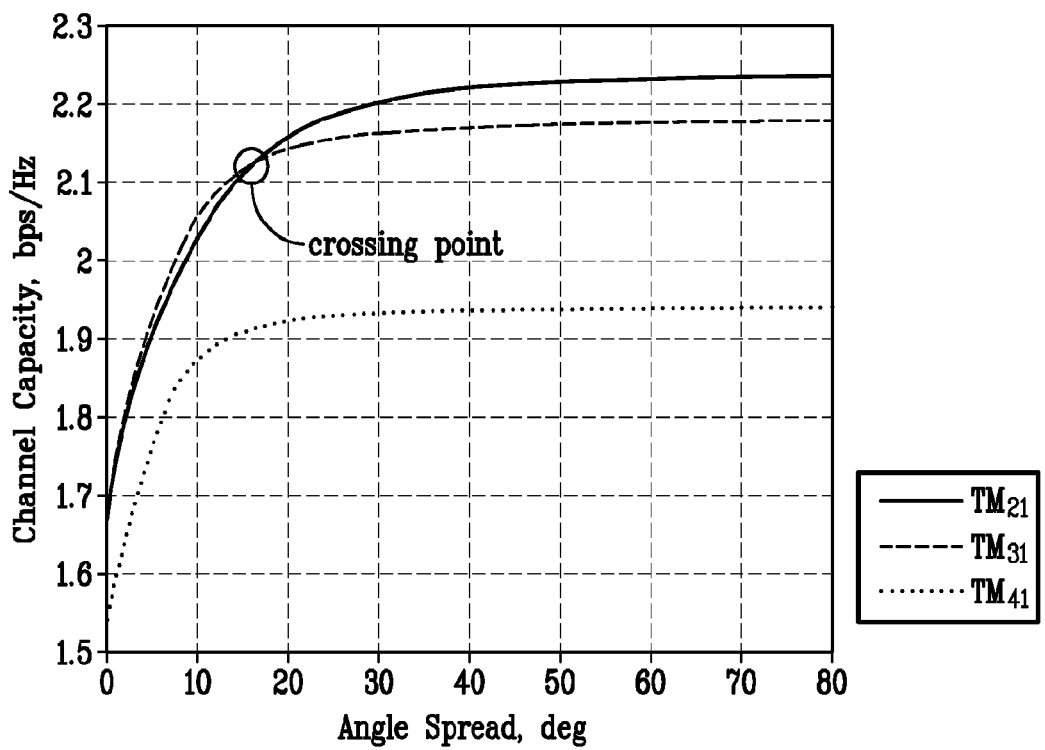
FIG. 4 illustrates channel capacity curves for three different antenna configurations ($TM_{21}$, $TM_{31}$, $TM_{41}$) as a function of the angle spread for a 2×2 MIMO system employing (a) the RCPA-2 at the receive and (b) an ideal RCPA with unitary radiation efficiency for all of the antenna configurations, where SNR=5 dB.
Figure 4B:
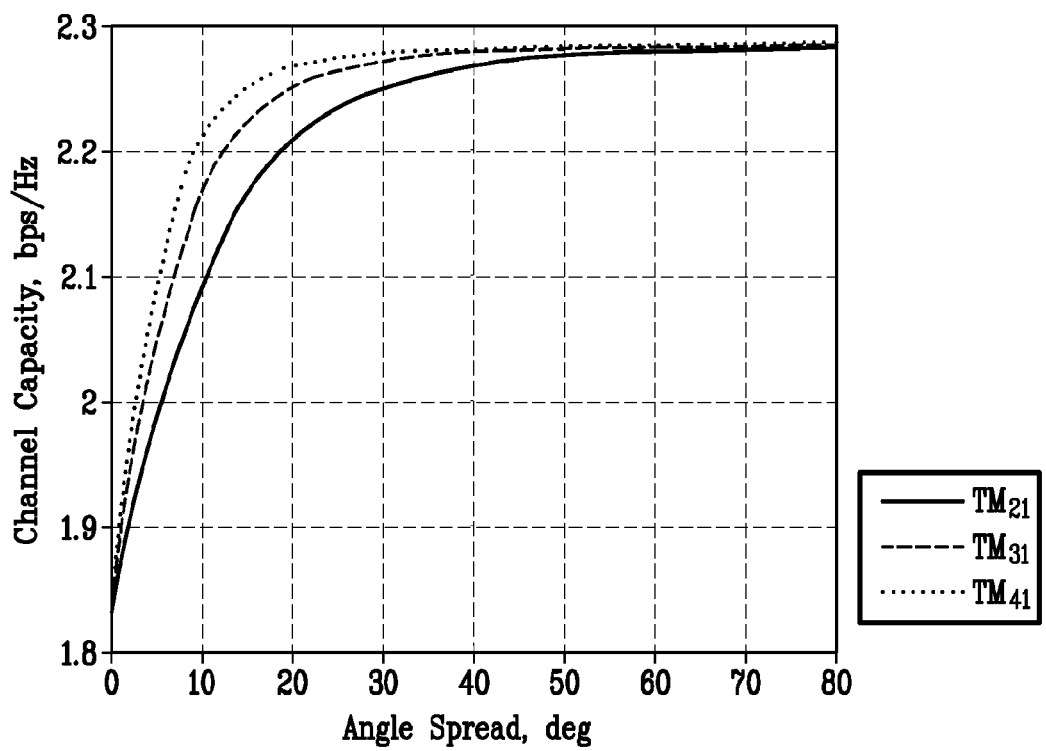

In another embodiment shown in FIG. 3(a) the average channel capacity achievable for some configurations of a reconfigurable circular patch antenna is reported as a function of the AS of the PAS, for a SNR=5 dB. The ergodic channel capacity values are averaged over all azimuthal angles ($\phi_c \in [0, 2\pi)$) of the incoming PAS. Note that these results of channel capacity have been determined for a RCPA built on a Rogers RT-duroid 5880 substrate and for a condition of perfect matching for all the antenna configurations (RCPA-1). Table III provides a summary of the antenna related parameters. The achievable average channel capacity varies as a function of the PAS angle spread. In particular, each antenna configuration outperforms the others for a certain range of angle spread. In FIG. 4 the same ergodic channel capacity of FIG. 3(a) is provided for a RCPA built on Rogers R03003 substrate (RCPA-2). The parameters for RCPA-2 are also described in Table III. As shown in this table, RCPA-2 is characterized by different values of radiation efficiency with respect to RCPA-1. A comparison of FIG. 3(a) with FIG. 4 shows that the crossing points of the channel capacity traces vary as a function of the radiation efficiency of the configuration. This effect can be better explained by looking at the average channel capacity curves relative to an ideal RCPA having unit efficiency for all its configurations (FIG. 4(b)). In this case, configuration $TM_{41}$ outperforms the other configurations for low AS while for large AS all the configurations perform the same. This happens because, at low AS, higher order modes are characterized by larger pattern diversity with respect to lower modes, while at high AS, the level of pattern diversity is similar for all the antenna modes. On the other hand, the radiation efficiency, that is larger for lower order modes than for higher modes, determines configuration $TM_{21}$ to have the best performance at high AS, as depicted in FIG. 3(a) and FIG. 4. A similar conclusion could be drawn if a variation in input impedance among the different antenna configurations.

TABLE III

RCPAs CHARACTERISTICS

| substrate | RCPA-1 Rogers RT-duroid 5880 | RCPA-2 Rogers R03003 |
|---|---|---|
| $\epsilon_r$ | 2.2 | 3 |
| $\eta_{TM_{21}}$ | 0.94 | 0.88 |
| $\eta_{TM_{31}}$ | 0.91 | 0.81 |
| $\eta_{TM_{41}}$ | 0.87 | 0.66 |
| $\rho_{TM_{21}}$ | $0.33\lambda$ | $0.28\lambda$ |
| $\rho_{TM_{31}}$ | $0.45\lambda$ | $0.39\lambda$ |
| $\rho_{TM_{41}}$ | $0.57\lambda$ | $0.49\lambda$ |
| $S_{11}$ | 0 | 0 |

Figure 3B:
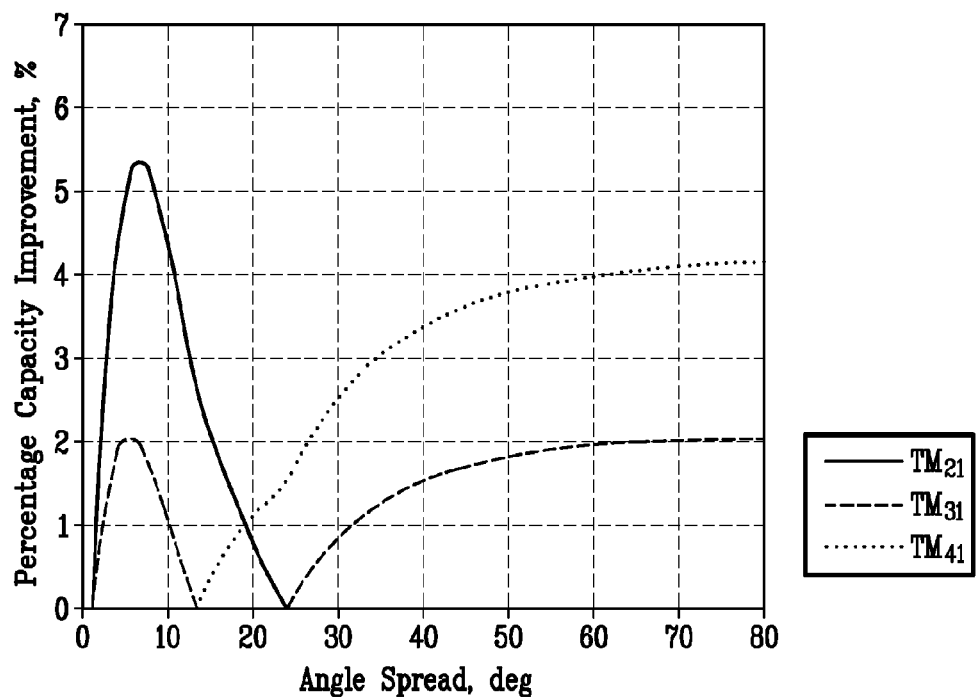
FIG. 3(b) illustrates the percentage capacity improvement as a function of AS achievable when using the RCPA-1 in the same 2×2 MIMO system relative to a non-reconfigurable antenna system employing circular patch antennas operating in modes $TM_{21}$, $TM_{31}$, and $TM_{41}$.

These results demonstrate the possibility of selecting the antenna configuration at the receiver based on PAS angle spread knowledge, once the average system SNR is known. In FIG. 3(b) the percentage capacity improvement achievable when using RCPAs relative to a non reconfigurable antenna system (i.e. fixed radius circular patch antennas operating in mode $TM_{21}$, $TM_{31}$ and $TM_{41}$). It can be noted that, for the system of FIG. 3(b), using angle spread information to switch between configurations leads to an average improvement of up to 5% with respect to a system that does not employ reconfigurable antennas.

Figure 5A:
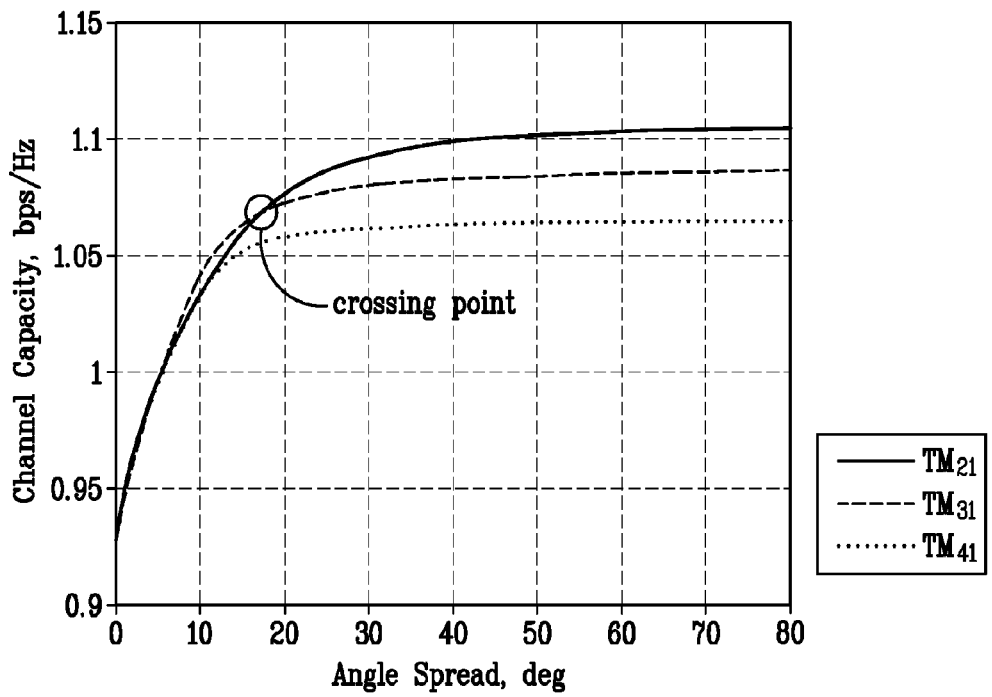
FIG. 5 illustrates channel capacity curves for three different antenna configurations as a function of the angle spread for a 2×2 MIMO system employing the RCPA-1 at the receiver for (a) SNR=0 dB and (b) SNR=20 dB.
Figure 5B:
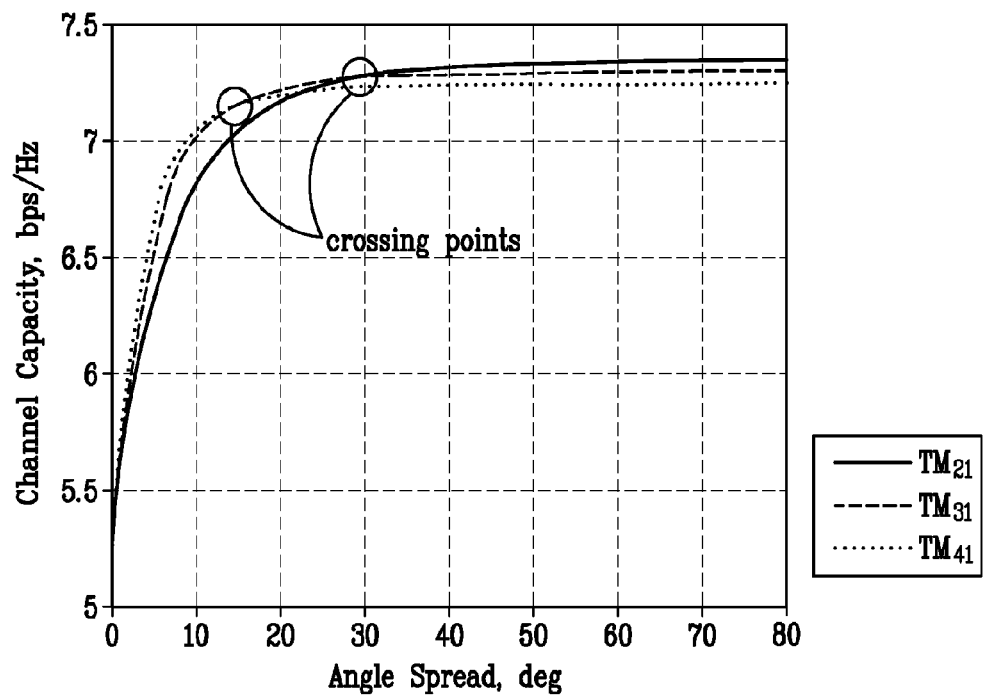

The ergodic channel capacity of a MIMO system does not depend only on the spatial correlation, but also on the system average SNR. In FIG. 5 the average channel capacity achievable for the different configurations of RCPA-1 is shown as a function of the AS of the PAS, for a SNR=20 dB (FIG. 5(a)) and SNR=0 dB. (FIG. 5(b)). The achievable channel capacity is, as expected, higher for the system with SNR=20 dB. than that of the same system with average SNR=5 dB (FIG. 8(a)) and SNR=0 dB. The angle spread crossing points of the capacity curves, for different antenna configurations, shift with varying average system SNR. Using the same reconfigurable antenna, at SNR=20 dB, the AS crossing points values are higher with respect to a system with SNR=0 dB.

Figure 6:
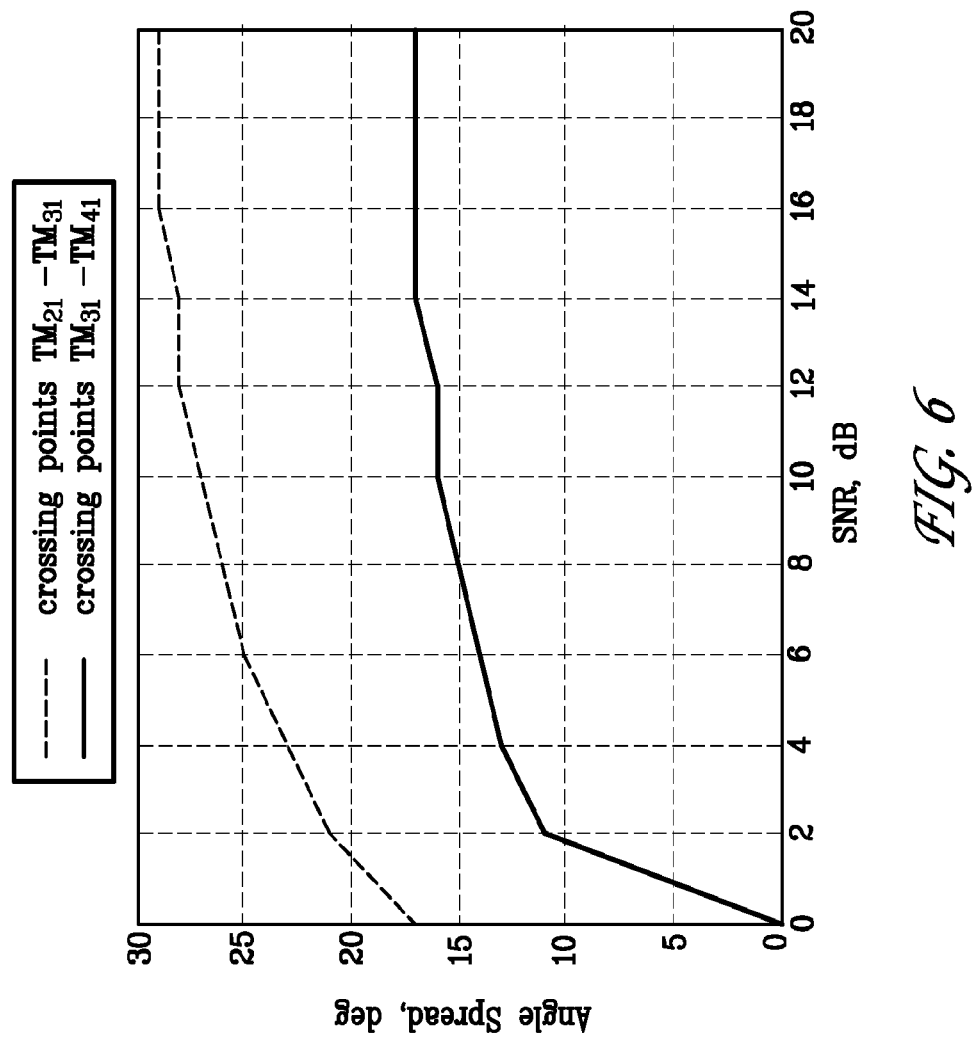
FIG. 6 illustrates angle spread crossing points versus SNR for configurations $TM_{21} \times TM_{31}$ and $TM_{31} \times TM_{41}$.

In FIG. 6 the AS crossing points for configurations $TM_{41}$-$TM_{31}$ and $TM_{31}$-$TM_{21}$ are reported as a function of the system average SNR, for a MIMO system that employs RCPA-1 at the receiver. As the value of average system SNR increases, the AS crossing point values increase as well. This effect can be explained because the channel capacity of MIMO systems can be increased in two ways: i) increasing the system diversity and ii) increasing the amount of signal power received. The system diversity is reflected in the antenna correlation coefficient, while the signal power received is influenced by the antenna efficiency and input impedance. Intuitively, at high SNR, since the received amount of power can not be greatly modified by varying the antenna efficiency and input impedance, the level of antenna diversity is the dominant contribution to the achievable channel capacity. At low SNR, instead, small variation in antenna efficiency and input impedance can greatly affect the amount of received signal power, and therefore antenna efficiency and input impedance are dominant contributions on the channel capacity trend.

As shown in FIG. 5(a) at low SNR, the most efficient antenna ($TM_{21}$) has larger advantage with respect to the other configurations. On the other hand, at high SNR (FIG. 5(b)) the configuration with the lowest spatial correlation ($TM_{41}$) outperforms the others for more values of angle spread with respect to the same system at lower SNR.

Based on the above observations, it is possible to select the antenna configuration at the receiver based on knowledge of PAS angle spread and average system SNR.

For example, in this embodiment, a parameter of discrimination between the different wireless channel scenarios is the reciprocal condition number of the transmit/receive correlation matrices:

$$D_\lambda = \frac{\lambda_{max}}{\lambda_{min}}$$

where $\lambda_{max}$ and $\lambda_{min}$ are the maximum and minimum eigenvalues of the transmit and receive correlation matrices.

Figure 7:
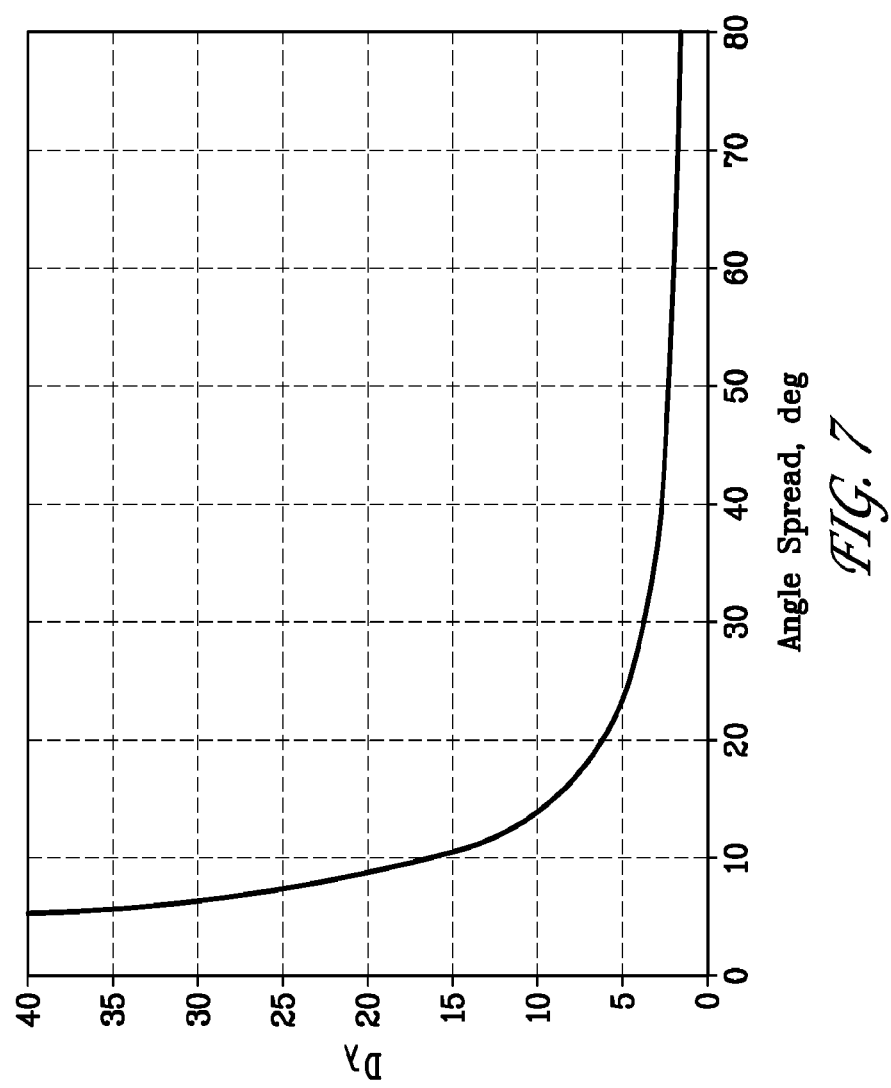
FIG. 7 illustrates reciprocal condition number, $D_\lambda$, as a function of the angle spread for the antenna configuration $TM_{21}$ used at the receiver in a 2×2 MIMO system.

In FIG. 7 a reciprocal condition number is plotted as a function of the angle spread of the PAS for a RCPA (RCPA-1) operating in mode $TM_{21}$. For each value of AS, there is a corresponding value of reciprocal condition number, in particular for low values of AS the reciprocal condition number is high and vice-versa. A map can be made given the average system SNR and the values of AS that define a switching point between two configurations (as shown in FIG. 3(a)) to a reciprocal condition number. In Table IV, a mapping of reciprocal condition number to corresponding values of AS regions is presented.

TABLE IV

RELATIONSHIP OF ANGLE SPREAD TO RECIPROCAL CONDITION NUMBER FOR SNR = 5 dB

| AS | $D_\lambda$ | CONFIGURATION |
|---|---|---|
| [0°, 13°] | (11, ∞) | $TM_{41}$ |
| [13°, 23°] | (5, 11] | $TM_{31}$ |
| [23°, 360°] | (0, 5] | $TM_{21}$ |

Note that, given the results of FIG. 3(a), only three regions of $D_\lambda$ need to be specified; each region corresponds to a particular antenna configuration at the receiver. This mapping procedure is necessary since the PAS angle spread is difficult to estimate, while the transmit/receive spatial correlation matrices can be estimated using standard techniques. Note that the mapping procedure varies with the average system SNR, as explained below. Therefore an antenna table, like the one of Table IV, need to be generated for each average SNR value. Alternatively, a two-entries table like the one of FIG. 12 can be generated. According to this channel parameterization, it is therefore possible to use second order wireless channel statistics together with the average SNR, in order to determine receiver array configuration. Note that this approach allows the system to select the antenna configuration using the spatial correlation matrix of only one reference antenna configuration without the need of estimating the channel response over each antenna configuration. This greatly simplifies channel estimation in reconfigurable MIMO systems (discussed further below). In the example of Table IV and FIG. 12, the antenna configuration $TM_{21}$ has been selected as an arbitrary reference antenna.

Another parameter of discrimination between the different wireless channel scenarios is the reciprocal condition number of the transmit/receive channel matrices, defined as:

$$D_\sigma = \frac{\sigma_{max}}{\sigma_{min}}$$

where $\sigma_{max}$ and $\sigma_{min}$ are the maximum and minimum eigenvalues of the transmit and receive channel matrices. An example of look up table built using this parameter is shown in FIG. 14(a).

Another parameter of discrimination between the different wireless channel scenarios is the delay spread, DS. An example of look up table built using this parameter is shown in FIG. 14(b).

Figure 11:
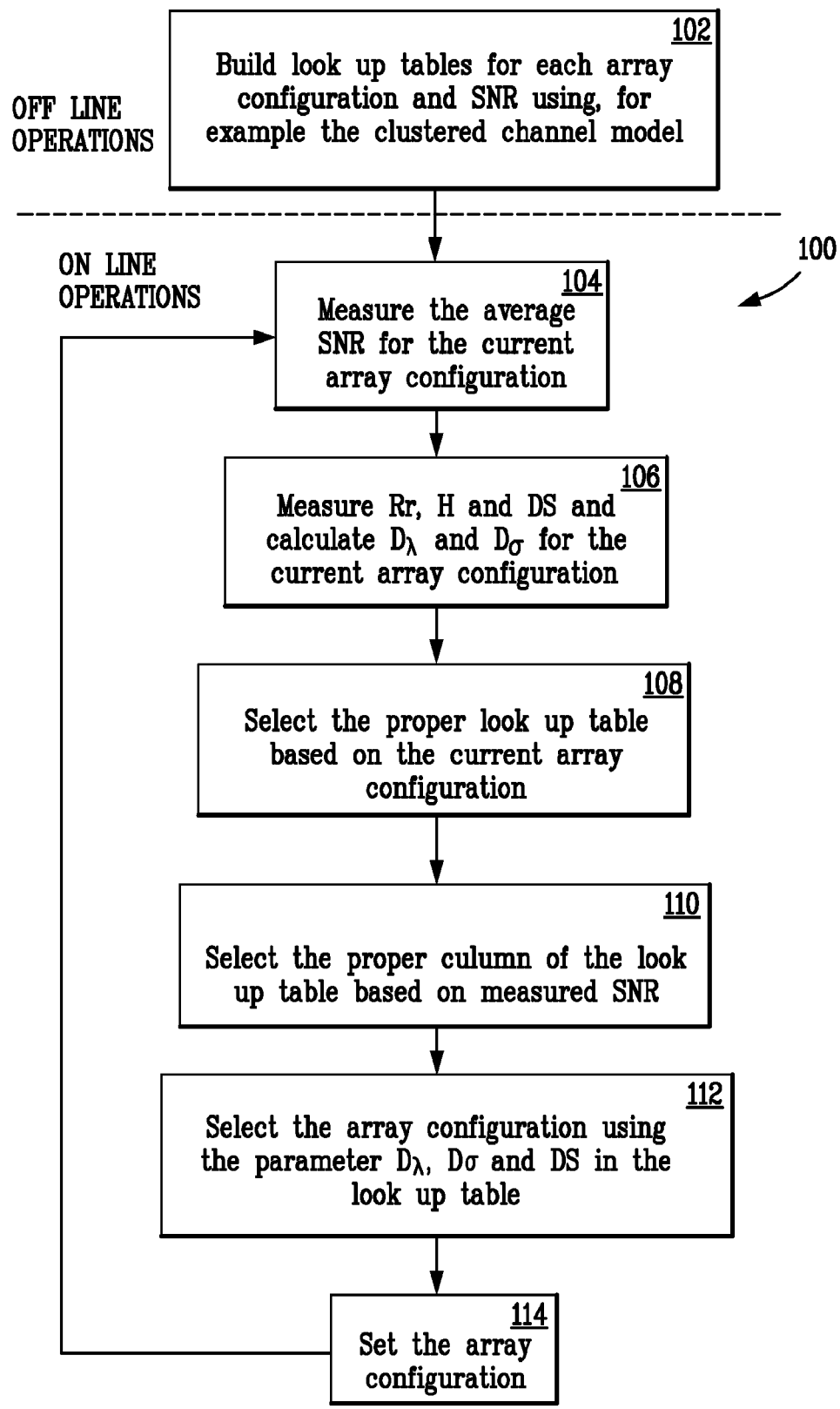
FIG. 11 illustrates a flow diagram that explains the selection of a proper group of look up tables based on the current array configuration.

In accordance with the invention, a method is provided for selecting the antenna configuration, without estimating the channel transfer matrix for each antenna configuration, but taking into account the effects of both directivity, radiation pattern shape and antenna gain. Such a method 100 can be summarized with respect to FIG. 11 as follows:

Off Line Operations:

1. Antenna look-up tables, like the one of FIG. 12, that maps the optimal antenna configuration to the range of reciprocal numbers and/or delay spread (DS) are built at step 102, one for each average SNR value, using, for example, the electromagnetic clustered channel model approach described above. The information can be received in data packets where each data packet is allocated for channel estimation.

On Line Operations:

2. The average system SNR is determined at step 104 and used to select the column of the antenna table generated for the current array configurations.

3. At least one of the spatial correlation matrix at the transmitter, Rt, and at the receiver, Rr, the transfer channel matrix H, and the delay spread DS are determined for a reference antenna configuration. The spatial correlation matrix at the transmitter, Rt, and at the receiver, Rr, are used to determine the channel reciprocal condition number, $D_\lambda$, and the transfer channel matrix, H, is used to determine the reciprocal condition number, $D_o$, of the current array configuration at step 106.

4. The current array configuration determined at step 106 is then used at step 108 to select the proper look up table (see, for example, FIGS. 12-14).

5. At step 110, the proper column of the selected look up table is selected based on the measured SNR.

6. The information of the reciprocal condition number, $D_\lambda$, of $D_o$ and/or DS is used together with the antenna table at step 112 to select the antenna configuration at the receiver, which is set at step 114.

An example of look up table to be used with the method is shown in FIG. 12 for reference configuration $TM_{21}$. It is also possible to define a group of look up tables where each look up table corresponds to a particular reference antenna configuration of the array as illustrated in FIG. 13.

The proposed selection algorithm requires the channel second order statistics to be constant over the configuration selection procedure. Estimation of the spatial correlation matrix could then be conducted using standard techniques. Once the channel correlation is estimated and the antenna configuration is selected, the L symbols of the pilot sequence can be used to estimate the channel for signal detection as discussed above.

Note also that variations of the method include the possibility of selecting the antenna configuration using $D_o$ and DS information. Examples of look up tables built using $D_o$ or DS are shown in FIG. 14 for the selection of the RCPA configurations of FIG. 1(b). Additional variations include use of electromagnetic ray tracing simulations to determine values needed to populate the look-up table.

A method also may be provided for using sub-training sequences to estimate the transfer channel matrix for a particular antenna configuration. According to this approach, the achievable ergodic capacity can then be computed. Note that contrary to this selection approach, the selection algorithm proposed herein always has Lp=L independently of the number of receiver antenna configurations. In this way, a better estimation of the channel matrix can be obtained, resulting in better signal detection, and therefore, higher achievable channel capacity and lower BER. The technique always selects the optimal antenna configuration based on the channel scenario that maximizes the receive signal-to-noise ratio, while the proposed selection scheme selects the antenna configuration that on average increases the spectral efficiency of the communication link. The reconfigurable array has a total radiation that guarantees quasi omni-directional coverage in a plane of an incoming signal.

The invention thus provides a method for estimating the channel only for a single antenna configuration rather than a selection scheme that needs to estimate the channel P times (one estimation per antenna configuration) for every training sequence.

In FIG. 8.(a) achievable channel capacity is shown as a function of the angle spread (AS) for a 2×2 MIMO system, with RCPA-1 at the receiver, that employs: (i) the proposed selection scheme including the effects of imperfect channel estimation (proposed algorithm np-CSI), (ii) the proposed selection scheme assuming perfect channel estimation (proposed algorithm p-CSI), (iii) an algorithm that selects the antenna configuration after estimating the channel for all possible configuration including the effects of imperfect channel estimation (standard np-CSI); and (iv) a standard algorithm assuming perfect channel estimation (standard p-CSI). The curves relative to the channel capacity achievable with non reconfigurable circular patch antennas operating in different modes assuming non-perfect channel estimation are also reported. In FIG. 8(b) the percentage capacity improvement, as a function of the angle spread (AS), is shown for the same 2×2 MIMO system that employs RCPA-1 at the receiver with the proposed selection algorithm relative to non reconfigurable antenna systems operating in different modes (proposed relative $TM_{21}$, $TM_{31}$ and $TM_{41}$) and RCPA system that selects the antenna configuration after exhaustively estimating the channel for all possible configurations (proposed relative standard (np-CSI)), where SNR=5 dB.

Figure 9:
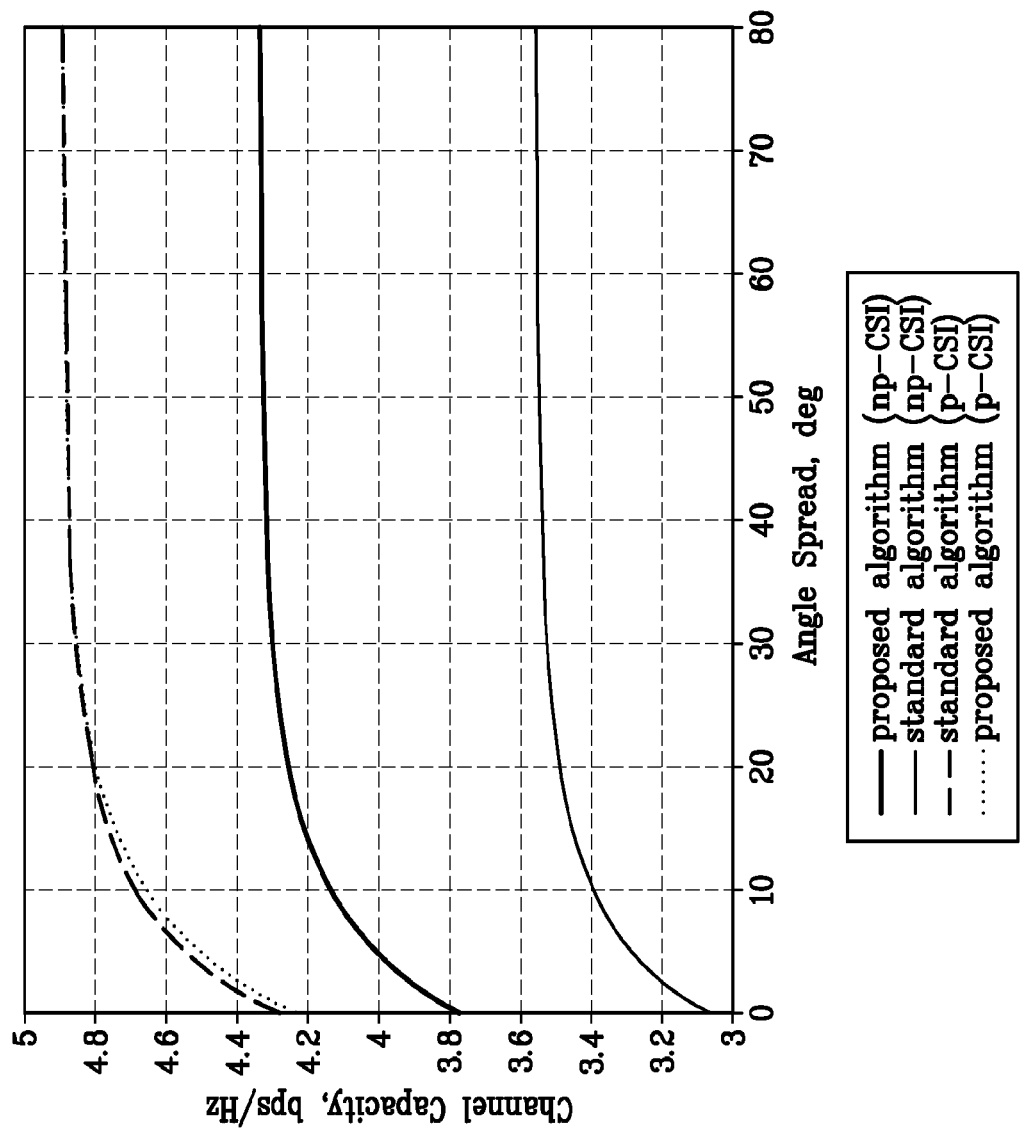
FIG. 9 illustrates achievable channel capacity as a function of the angle spread (AS) for a 2×6 MIMO with RCPAs (RCPA-1) at the receiver.

In FIG. 9, the channel capacity achievable with the proposed selection scheme is determined for a 2×6 MIMO system employing RCPAs only at the receiver for a SNR=5 dB. The MIMO system configuration is shown in Table V. In this case, three RCPAs, built on Rogers RT-duroid 5880 substrate (RCPA-1), are used at the receiver with spatial separation of multiple wavelengths, such as to be uncorrelated one with the other. A total of ten possible array configurations can then be selected at the receiver (P=102), using a RCPA that is capable of switching between modes $TM_{21}$, $TM_{31}$ and $TM_{41}$. At the transmitter assume RTX=I. Since the number of antenna configurations is higher than the 2×2 MIMO case (where P=3) the capacity improvement achievable using the proposed selection scheme is higher. The improvement is almost 20%. As explained above, the greater the number of array configurations, the worse the channel transfer matrix detection, and therefore the worse the channel capacity. This problem is addressed by the proposed selection scheme that needs to estimate the channel for a single antenna configuration independently of the number of array configurations.

TABLE V

MIMO SYSTEM CONFIGURATION

| RCPA type | 2 × 2 MIMO System RCPA-1 | 2 × 6 MIMO System RCPA-1 |
|---|---|---|
| array configurations states (P) | 3 | 10 |
| $\mu_{proposed\ algorithm}$ | 6% | 11% |
| $\alpha_{proposed\ algorithm}$ | 0.44 | 0.58 |

TABLE V-continued

MIMO SYSTEM CONFIGURATION

| RCPA type | 2 × 2 MIMO System RCPA-1 | 2 × 6 MIMO System RCPA-1 |
|---|---|---|
| $\mu_{standard\ algorithm}$ | 10% | 20% |
| $\alpha_{standard\ algorithm}$ | 0.61 | 0.88 |

An analysis of the proposed configuration selection algorithm performance, in terms of BER, has been conducted for a 2×2 MIMO system employing RCPA-1 antennas at the receiver. The modulation scheme considered is BPSK without any additional coding. BER values have been calculated assuming perfect decoupling at the receiver of the two Single Input Single Output (SISO) links comprising the 2×2 MIMO system.

The proposed algorithm achieves an appreciable gain with respect to a standard selection algorithm that selects the antenna configuration after exhaustively estimating the channel for each configuration. Using the proposed algorithm the channel is better estimated than with the standard algorithm. Specifically, in the proposed algorithm, the training sequence is entirely allocated to estimate the channel for a single antenna configuration, instead of being allocated to estimate the channel for all possible array configurations. This effect can be better observed by comparing the BER curve of a system with perfect channel estimation (standard algorithm p-CSI) with the BER curves of systems with imperfect channel estimation (proposed algorithm np-CSI and standard algorithm np-CSI).

Unlike a standard algorithm, the proposed configuration selection scheme estimates the channel for a single antenna configuration and therefore the quality of channel estimation remains the same, independent of the number of array configurations. However, the diversity order of the system that uses the proposed algorithm is degraded with respect to a system that uses the standard algorithm. This diversity order degradation is due to the fact that the proposed selection algorithm does not select the optimal antenna configuration for each particular channel realization, but it selects the antenna configuration that, on average, increases the spectral efficiency of the communication link.

Figure 10A:
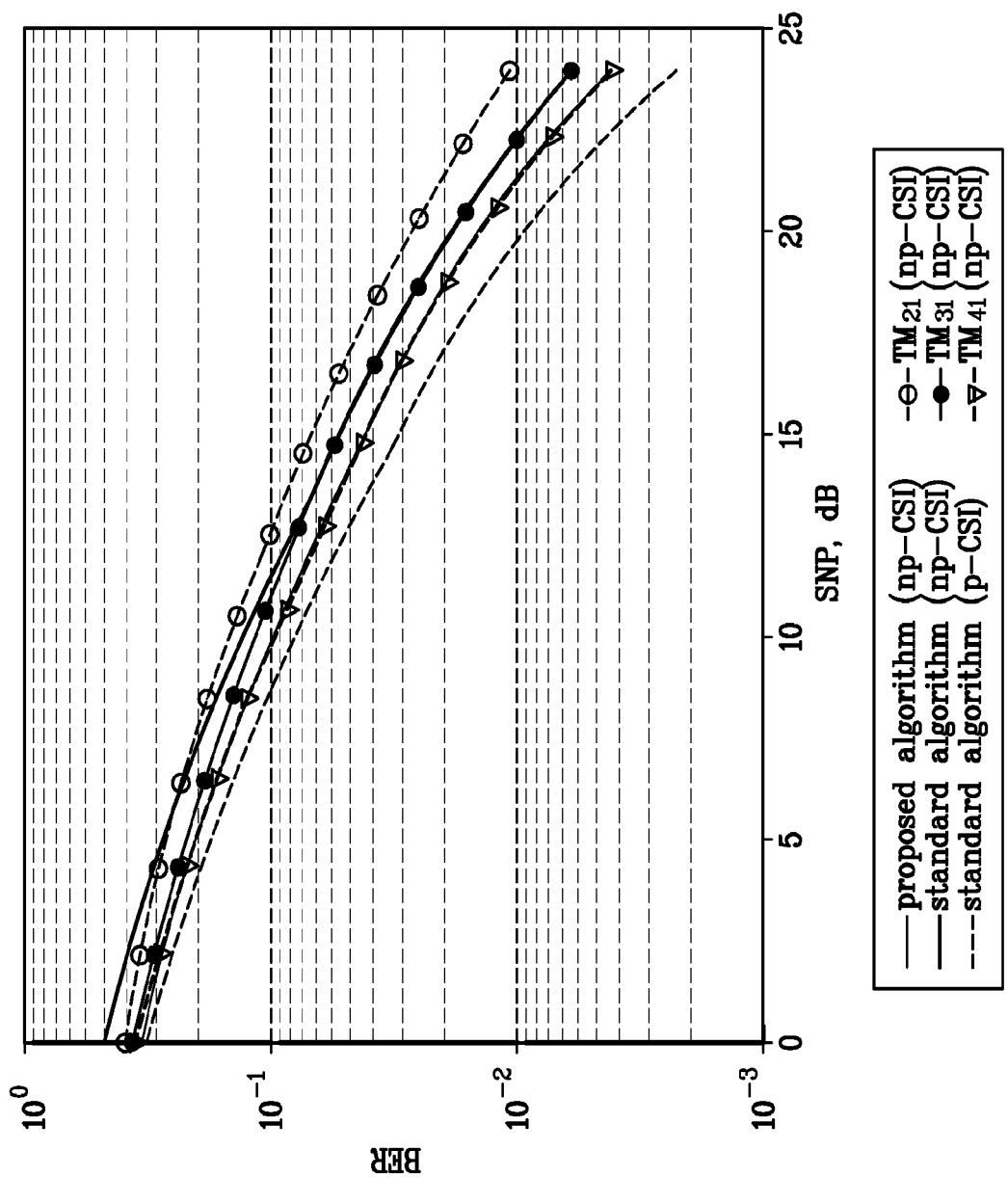
FIG. 10 illustrates BER versus SNR for a 2×2 MIMO system with RCPA-1 at the receiver.

In FIG. 10(a), BER versus SNR is illustrated for a 2×2 MIMO system, with RCPA-1 at the receiver, that employs: (i) the proposed selection scheme including the effects of imperfect channel estimation (proposed algorithm np-CSI), (ii) an algorithm that selects the antenna configuration after estimating the channel for all possible configuration including the effects of imperfect channel estimation (standard np-CSI), and (iii) a standard algorithm assuming perfect channel estimation (standard p-CSI). The BER curves relative to non reconfigurable circular patch antennas operating in different modes assuming non-perfect channel estimation are also reported at AS=10°.

Figure 10B:
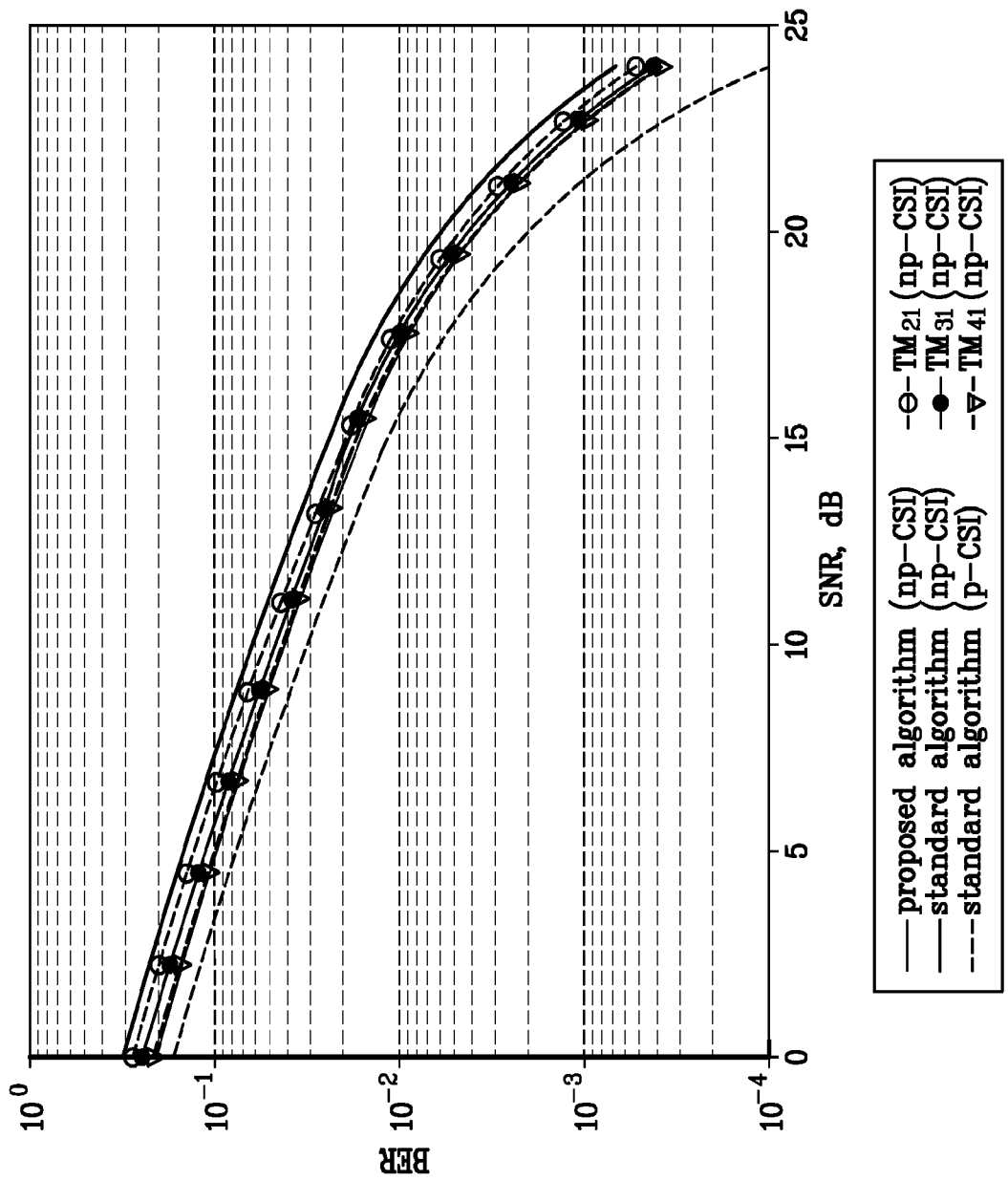

In FIG. 10(b) the same BER curves are shown for an angle spread of 60°. A similar gain is achieved using the proposed algorithm with respect to a system that selects the antenna configuration after exhaustively estimating the channel for each configuration. However, it may be observed that, different from the case of FIG. 10(a), at high AS the proposed algorithm always selects configuration $TM_{21}$. Recall that $TM_{21}$ on average outperforms the other configurations, according to the results above. Also, at high AS, the BER curve slope remains the same for all the different configurations; therefore the level of diversity provided by the different configurations is the same. The diversity level also affects the trend of the BER curves for the proposed algorithm (proposed algorithm np-CSI) and the standard algorithm (standard algorithm np-CSI). Unlike the results from FIG. 10(a), at high AS, the BER curve slope is the same for both systems; therefore, at high AS, the two systems are characterized by the same diversity order.

The group of look up tables shown in FIG. 13 (one look up table per array configuration) are pre-computed using the radiation patterns of the reconfigurable antenna array at the receiver together with a statistical model of the wireless channel (e.g. the clustered channel model). The RCPA radiation patterns and a clustered channel model are used to determine which array configuration achieves the highest channel capacity for a particular range of SNR and angle spread of the power angular spectrum (see FIG. 5 and FIG. 6). This information is used to build the group of look up tables of FIG. 13. SNR and $D_\lambda$ are used as entries of the look up tables to select the array configuration at the receiver. Setting the antenna array configuration affects the shape of a radiation pattern, polarization of the radiation pattern, and/or separation between array elements of the antenna array. The transmission power can be equally distributed amongst array elements or adaptively distributed among the elements of the transmitter antenna array.

The group of look up tables is stored on a processing unit. Assuming that the array configuration at the receiver is set on configuration $TM_{21}$, the processing unit runs the following algorithm:

Scenario 1:
1. The receiver waits to receive N data packets.
2. The last N data packets are used to measure the receive spatial correlation matrix, $R_R$, and SNR and to calculate $D_\lambda$. In the case of FIG. 13, SNR=6.5 dB and $D_\lambda$=27.
3. Since configuration $TM_{21}$ is in use, the processing unit selects from the group of look up tables the look up table for "reference configuration $TM_{21}$" (see FIG. 13).
4. The value of SNR is rounded to the closest integer shown in the selected look up table. In the case of FIG. 13, SNR=5 dB.
5. SNR=5 dB and $D_\lambda$=27 are used as entries for the selected look up table in order to define the array configuration to be used at the receiver. In this case, configuration $TM_{31}$ is selected.
6. Configuration $TM_{31}$ is set at the receiver of the communication link and the algorithm starts again from 1.

In case the antenna configuration does not change after the processing unit completes all six steps, a variation from the example shown above could be the following:

Scenario 2:
1. The receiver waits to receive N data packets.
2. The last N data packets are used to measure the receive spatial correlation matrix, $R_R$, and SNR and to calculate $D_\lambda$. In this case, SNR=6.5 dB and $D_\lambda$=5.
3. Since configuration $TM_{21}$ is in use, the processing unit selects from the group of look up tables the look up table for "reference configuration $TM_{21}$" (see FIG. 13).
4. The value of SNR is rounded to the closest integer shown in the selected look up table. In this case, SNR=5 dB.
5. SNR=5 dB and $D_\lambda$=5 are used as entries for the selected look up table in order to define the array configuration to be used at the receiver. In this case, configuration $TM_{21}$ is selected.
6. Configuration $TM_{21}$ is kept at the receiver of the communication link.
7. The receiver waits to receive 1 data packet.
8. The last N data packets are used to measure $R_R$, SNR and to calculate D. In this case SNR=6.5 dB and $D_\lambda$=27.

9. Since configuration $TM_{21}$ is in use, the processing unit selects from the group of look up tables the look up table for "reference configuration $TM_{21}$" (see FIG. 13).
10. The value of SNR is rounded to the closest integer shown in the selected look up table. In this case, SNR=5 dB.
11. SNR=5 dB and $D_\lambda$=27 are used as entries for the selected look up table in order to define the array configuration to be used at the receiver. In this case, configuration $TM_{31}$ is selected.
12. Configuration $TM_{31}$ is set at the receiver of the communication link and the algorithm starts again from step 1 of SCENARIO 1.

In case the reconfigurable antenna system is employed at the transmitter and at the receiver, both the receiver and the transmitter will have a processing unit. Assuming that configuration $TM_{21}$ is initially in use at the transmitter and at the receiver, SCENARIO 1 will change as follows:

Scenario 3.A (RX and TX):
1. The receiver waits to receive N data packets.
2. The last N data packets are used to measure $R_R$, $R_T$, and the SNR at the receiver. $D_\lambda$ at the receiver is calculated from $R_R$, while $D_\lambda$ at the transmitter is calculated from $R_T$. In this case, SNR at the receiver=6.5 dB and $D_\lambda$=27 at the receiver and $D_\lambda$=52 at the transmitter.
3. The receiver sends through a feedback channel the information $D_\lambda$=52 to the transmitter processing unit.
4. The last transmitted N data packets are used to measure the SNR at the transmitter. In this case, SNR=25 dB at the transmitter.
5. Since configuration $TM_{21}$ is in use at the transmitter and at the receiver, the transmitter and receiver processing units select from the group of look up tables the look up table for "reference configuration $TM_{21}$" (see FIG. 13).
6. The value of SNR is rounded to the closest integer shown in the selected look up table. In this case, SNR=5 dB at the receiver and SNR=25 dB at the transmitter.
7. SNR=5 dB and D$\lambda$=27 are used as entries for the selected look up table at the receiver in order to define the array configuration to be used at the receiver. In this case configuration $TM_{31}$ is selected.
8. SNR=25 dB and $D_\lambda$=52 are used as entries for the selected look up table at the transmitter in order to define the array configuration to be used at the transmitter. In this case configuration $TM_{41}$ is selected.
9. Configuration $TM_{31}$ is set at the receiver of the communication link, while configuration $TM_{41}$ is set at the transmitter and the algorithm starts again from 1.

Depending on the user preference, it is possible to implement also the following variation:

Scenario 3.B (RX and TX)
1. The receiver waits to receive N data packets.
2. The last N data packets are used to measure $R_R$, SNR and to calculate $D_\lambda$. In this case, SNR=6.5 dB nd $D_\lambda$=27.
3. Since configuration $TM_{21}$ is in use, the processing unit select from the group of look up tables the look up table for "reference configuration $TM_{21}$" (see FIG. 13).
4. The value of SNR is rounded to the closest integer shown in the selected look up table. In this case, SNR=5 dB.
5. SNR=5 dB and $D_\lambda$=27 are used as entries for the selected look up table in order to define the array configuration to be used at the receiver. In this case configuration $TM_{31}$ is selected.
6. Configuration $TM_{31}$ is set at the receiver of the communication link while the transmitter is still using configuration $TM_{21}$.
7. The transmitter sends other M data packets.
8. The receiver waits to receive these M data packets.
9. The last M data packets are used to measure $R_T$ and to calculate $D_\lambda$ at the transmitter. In this case, $D_\lambda$=52 at the transmitter.
10. The receiver sends through a feedback channel the information $D_\lambda$=52 to the transmitter processing unit.
11. The last transmitted M data packets are used to measure the SNR at the transmitter. In this case, SNR=25 dB at the transmitter.
12. Since configuration $TM_{21}$ is in use at the transmitter, the transmitter processing units select from the group of look up tables the look up table for "reference configuration $TM_{21}$" (see FIG. 13)..
13. The value of SNR is rounded to the closest integer shown in the selected look up table. In this case, SNR=25 dB at the transmitter.
14. SNR=25 dB and $D_\lambda$=52 are used as entries for the selected look up table at the transmitter in order to define the array configuration to be used at the transmitter. In this case, configuration $TM_{41}$ is selected.
15. Configuration $TM_{41}$ is set at the transmitter and the algorithm starts again from 1.

Note that the variation of SCENARIO 2 is applicable to SCENARIO 3.A and SCENARIO 3.B. In the above examples, look-up tables that use $D_\lambda$ and SNR as entries were used to determine the antenna configuration to be used at the transmitter/receiver. As described above, other parameters like $D_\sigma$ and DS can be used as entries for these look up tables. The above examples can then be modified using tables similar to the ones shown in FIG. 14.

The diversity order of a system that adopts the proposed algorithm falls in between the upper bound of a system that adopts a standard configuration selection algorithm and the lower bound of a system that employs non reconfigurable antennas. On the other hand, it is observed that the proposed algorithm allows for better channel estimation (and thus, higher receiver SNR) than a standard configuration selection scheme.

Note that the proposed method for selecting the antenna configuration can be used with multi element reconfigurable antennas in MIMO, SIMO and MISO systems independently from the wireless communication system. Possible wireless communication systems that can take advantage of this selection algorithm are wireless local area networks, wireless personal area networks, wireless ad hoc networks, sensor networks, wireless body area networks, radar systems, satellite communications, 3G and 4G cellular networks, and wireless communication systems that employ beam forming, spatial multiplexing, or space time diversity transmission schemes.

In one embodiment a method of using the channel model to build the look up tables will need to be properly selected based on the particular application. Parts of such a system would include a transmitter antenna array and a receiver antenna array (which can use both linear and non linear receivers) with multiple reconfigurable elements; a processor to implement the selection software and create the look-up tables; PIN diodes, MEMS switches, FET transistors, variable inductors and/or variable capacitors used to adjust the configuration based on the configuration data received from the processor through data packets. The values reported in the look up tables of FIGS. 12, 13 and 14, for example, have been determined using an electromagnetic cluster channel model defined for indoor MIMO wireless local area networks as stated in the paper authored by V. Erceg et al, "TGn Channel models," IEEE 802.11.03/9490r4, 2004. The wireless channel model need to be selected with reference to the specific application in order to determine the values to be used in the look up tables.

While the invention has been described with reference to specific embodiments, the description is illustrative of the invention and is not to be construed as limiting the invention. Various modifications and applications may occur to those skilled in the art without departing from the spirit and scope of the invention as defined by the appended claims.

Therefore, it must be understood that the illustrated embodiment has been set forth only for the purposes of example and that it should not be taken as limiting the invention as defined by the following claims. For example, not withstanding the fact that the elements of a claim are set forth below in a certain combination, it must be expressly understood that the invention includes other combinations of fewer, more, or different elements, which are disclosed above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

What is claimed is:

1. A method of selecting an antenna array configuration for a multi-element reconfigurable transmitter antenna and a multi-element reconfigurable receiver antenna, comprising the steps of:

providing receiver look-up tables accessible by a receiver processor associated with said receiver antenna for at least 1 of N antenna array configurations, said receiver look up tables including values for antenna related parameters of discrimination between different wireless channel scenarios, said antenna related parameters comprising at least one of a signal to noise ratio (SNR), an angular spread (AS), a reciprocal condition number ($D_o$), a reciprocal condition number of the transmit/receive correlation matrices ($D_\lambda$) and a delay spread (DS);

said receiver processor estimating values for said antenna related parameters for at least one but less than N antenna array configurations;

said receiver processor setting the antenna array configuration for the receiver antenna based at least in part on said estimated values and an array configuration retrieved from a receiver look up table using the estimated values;

a transmitter processor associated with the transmitter antenna calculating SNR at the transmitter antenna;

the receiver processor calculating $D_\lambda$ at the transmitter antenna and providing the calculated $D_\lambda$ at the transmitter antenna to the transmitter processor, and the transmitter processor further using the received $D_\lambda$ to retrieve an antenna array configuration for the transmitter antenna from the transmitter look up tables;

the transmitter processor using the SNR at the transmitter antenna to retrieve an antenna array configuration for the transmitter antenna from transmitter look up tables accessible by said transmitter processor for at least 1 of N antenna array configurations, said transmitter look up tables including values for at least one of SNR, AS, $D_o$, $D_\lambda$ and DS; and the transmitter processor setting the antenna array configuration for the transmitter antenna based on the retrieved antenna array configuration for the transmitter antenna.

2. The method of claim 1, further comprising determining a signal correlation for a current array configuration and using the signal correlation to determine $D_\lambda$.

3. The method of claim 1, further comprising determining a channel transfer matrix for a current array configuration and using the channel transfer matrix to determine $D_o$.

4. The method of claim 1, further comprising selecting the receiver look-up table based on the array configuration that was used to build the receiver look-up table.

5. The method of claim 1, further comprising selecting the receiver look-up table based on a direct measured signal to noise ratio.

6. The method of claim 1, wherein the angular spread is estimated using $D_o$ and/or $D_\lambda$.

7. The method of claim 1, wherein building the receiver look up tables comprises using an electromagnetic clustered channel model.

8. The method of claim 1, wherein building the receiver look-up tables comprises using an electromagnetic ray tracing simulation.

9. The method of claim 1, wherein building the receiver look-up tables comprises using channel measurements.

10. The method of claim 1, wherein building the receiver look-up tables comprises using a system performance metric.

11. The method of claim 10, wherein the selected performance metric comprises channel capacity, data transfer rate, bit error rate, packet error rate, or amount of transmit power.

12. The method of claim 1, wherein the antenna array configuration set in the setting step is a reconfigurable array with total radiation pattern that guarantees quasi omni-directional coverage in a plane of an incoming signal.

13. The method of claim 1, wherein setting of the antenna array configuration affects the shape of a radiation pattern, polarization of the radiation pattern, and/or separation between array elements of the antenna array.

14. The method of claim 13, further comprising using connective means to reconfigure the antenna array configuration to the set antenna array configuration.

15. The method of claim 14, wherein using connective means to reconfigure the antenna array configuration comprises setting PIN diodes, MEMS switches, FET transistors, variable inductors and/or variable capacitors.

16. The method of claim 12, wherein the antenna array configuration is a circular patch antenna array.

17. The method of claim 1, wherein said estimated values are estimated from information received in data packets of which part of each data packet is allocated for channel estimation.

18. A transmission system for transmitting data from a first location having a transmitter antenna and a transmitter processor to a second location having a receiver antenna and a receiver processor, each of said receiver antenna and said transmitter antenna comprising an array having multiple reconfigurable elements, wherein said receiver processor implements receiver selection software for selecting an antenna array configuration for said receiver antenna array, said receiver selection software, when implemented, causing said receiver processor to build receiver look-up tables for at least 1 of N antenna array configurations, said receiver look up tables including antenna related parameters of discrimination between different wireless channel scenarios, said antenna related parameters comprise at least one of a signal to noise ratio (SNR), an angular spread (AS), a reciprocal condition number ($D_o$), a reciprocal condition number of the transmit/receive correlation matrices ($D_\lambda$) and a delay spread (DS), to estimate values for said antenna related parameters for at least one but less than N antenna array configurations, to calculate $D_\lambda$ at the transmitter antenna and provide the calculated $D_\lambda$ at the transmitter antenna to the transmitter processor, and the transmitter processor further uses the received $D_\lambda$ to retrieve an antenna array configuration for the transmitter antenna from the transmitter look up tables, and to set the antenna array configuration for the receiver antenna based at least in part on such estimated values and an array configuration retrieved from a receiver look up table using the estimated values; and said transmitter processor implements transmitter selection software for selecting an antenna array configuration for said transmitter antenna array, said transmitter selection software, when implemented, causing said transmitter processor to build transmitter look up tables for at least 1 of N antenna array configurations, said transmitter look up tables including values for at least one of SNR, AS, $D_o$, $D_\lambda$ and DS, to retrieve an antenna array configuration for the transmitter antenna from the transmitter look up tables using a value for SNR calculated at the transmitter antenna, and to set the antenna array configuration for the transmitter antenna based on the retrieved antenna array configuration for the transmitter antenna.

19. The system of claim 18, further comprising connective means that are adjusted by said processor to reconfigure the antenna array configuration to the set antenna array configuration.

20. The system of claim 19 wherein said connective means comprises PIN diodes, MEMS switches, FET transistors, variable inductors and/or variable capacitors.

21. The system of claim 18 wherein the reconfigurable antenna array configuration comprises a circular patch antenna array.

22. The system of claim 18, wherein said estimated values are estimated from information received in data packets of which part of each data packet is allocated for channel estimation.

23. The system of claim 18, wherein the receiver antenna array uses linear or nonlinear receivers to perform channel estimation.

24. The system of claim 18, wherein transmit power is equally distributed amongst array elements of said transmitter antenna array.

25. The system of claim 18, wherein transmit power is adaptively distributed amongst array elements of said transmitter antenna array.

26. The system of claim 18, wherein the multiple reconfigurable elements are used in a wireless communication system.

27. The system of claim 26, wherein the wireless communication system employs beam forming, spatial multiplexing, or space time diversity transmission schemes.

28. The system of claim 26, wherein the wireless communication system comprises a wireless local area network, a wireless personal area network, a wireless ad hoc network, a sensor network, a wireless body area network, a radar system, a satellite communications network, a 3G cellular network, and/or a 4G cellular network.

* * * * *

UNITED STATES PATENT AND TRADEMARK OFFICE
CERTIFICATE OF CORRECTION

PATENT NO.         : 8,908,787 B2
APPLICATION NO.    : 13/146332
DATED              : December 9, 2014
INVENTOR(S)        : Daniele Piazza et al.

It is certified that error appears in the above-identified patent and that said Letters Patent is hereby corrected as shown below:

On The Title Page, Item (73) Assignee should read

-- Assignee:   Drexel University        Philadelphia, Pennsylvania
               Politecnico di Milano    Milano, Italy --.

Signed and Sealed this
Fifteenth Day of December, 2015

Michelle K. Lee
*Director of the United States Patent and Trademark Office*